US006935062B2

(12) United States Patent
Lowry et al.

(10) Patent No.: US 6,935,062 B2
(45) Date of Patent: Aug. 30, 2005

(54) LABEL HOLDER FOR ELECTRONIC LABELING DEVICES

(75) Inventors: Michael G. Lowry, Boca Raton, FL (US); Jacob Fast, Boca Raton, FL (US); Charles Marino, Rockford, IL (US)

(73) Assignee: Fast Industries, Ltd., Fort Lauderdale, FL (US)

( * ) Notice: Subject to any disclaimer, the term of this patent is extended or adjusted under 35 U.S.C. 154(b) by 0 days.

(21) Appl. No.: 10/448,049

(22) Filed: May 30, 2003

(65) Prior Publication Data

US 2004/0262470 A1 Dec. 30, 2004

Related U.S. Application Data

(60) Provisional application No. 60/471,726, filed on May 20, 2003, and provisional application No. 60/398,730, filed on Jul. 29, 2002.

(51) Int. Cl.$^7$ .................................................. G09F 3/18
(52) U.S. Cl. ............................... 40/661.03; 248/205.1; 248/223.41; 40/649; 40/651
(58) Field of Search ...................... 40/651, 668, 661.03, 40/649, 642.02, 661.08, 617; 248/205.1, 223.41, 222.11, 222.12, 224.51, 225.11

(56) References Cited

U.S. PATENT DOCUMENTS

| | | | | |
|---|---|---|---|---|
| 3,142,124 A | * | 7/1964 | Ownbey ........................ 40/618 |
| 4,334,372 A | * | 6/1982 | Colmar ......................... 40/650 |
| 4,426,797 A | * | 1/1984 | Burkemper et al. ........... 40/651 |
| 4,532,726 A | * | 8/1985 | Kenney ......................... 40/650 |
| 4,625,441 A | | 12/1986 | Fast | |
| 4,716,669 A | | 1/1988 | Fast | |
| 5,357,701 A | * | 10/1994 | Grate ............................ 40/618 |
| 5,392,547 A | * | 2/1995 | Mason ..................... 40/661.06 |
| 5,419,066 A | * | 5/1995 | Harnois et al. .......... 40/661.03 |
| 5,458,307 A | | 10/1995 | Gebka | |
| 5,488,793 A | | 2/1996 | Gebka et al. | |
| 5,515,632 A | | 5/1996 | Gebka et al. | |
| 5,678,699 A | | 10/1997 | Gebka | |
| 5,682,698 A | | 11/1997 | Bevins | |
| 5,899,011 A | * | 5/1999 | Brinkman ................ 40/661.03 |
| 6,026,603 A | * | 2/2000 | Kump et al. ............. 40/661.03 |
| 6,035,569 A | * | 3/2000 | Nagel et al. ............. 40/661.03 |
| 6,119,990 A | * | 9/2000 | Kump et al. ........... 248/220.22 |
| 6,163,996 A | | 12/2000 | Gebka | |
| 6,189,248 B1 | | 2/2001 | Nagel et al. | |
| 6,481,133 B1 | * | 11/2002 | DeSena ................... 40/661.03 |
| 6,491,468 B1 | * | 12/2002 | Hagen ......................... 403/291 |
| 6,543,166 B1 | * | 4/2003 | Griffin ......................... 40/618 |
| 6,568,112 B2 | * | 5/2003 | Lowry et al. ............ 40/661.03 |

FOREIGN PATENT DOCUMENTS

| | | |
|---|---|---|
| DE | 19501974 | 7/1996 |
| WO | WO 9832115 | 7/1998 |

* cited by examiner

*Primary Examiner*—Ramon O. Ramirez
*Assistant Examiner*—Amy J. Sterling
(74) *Attorney, Agent, or Firm*—Jacobson Holman PLLC

(57) ABSTRACT

Electronic shelf label (ESL) carriers including an attachment member to be secured to a supporting surface such as a C-channel, a holder member with tabs for removably receiving and supporting the ESLs, and a cover member pivotally carried by the top or the bottom of the holder member to overly and protect the ESLs. The attachment member and the holder member include interengageable complementary adjustment elements to enable the ESLs to be displayed at a zero angle or a positive or negative angular orientation relative to the supporting surface. In one embodiment, the attachment member has a pair of forwardly extending legs each of which include a pair of spaced cavities, with the holder member including upper and lower elements with complementary protrusions which can be selectively engaged in the cavities to adjust the viewing angle. Other embodiments include a plurality of spaced T-shaped protrusions on an arcuate portion or a portion with a central section and angularly offset wings of the attachment member, the stems of the T-shaped protrusions being flexible to enable the cross-bars to be selectively engaged in complementary cavities defined on the holder member.

32 Claims, 22 Drawing Sheets

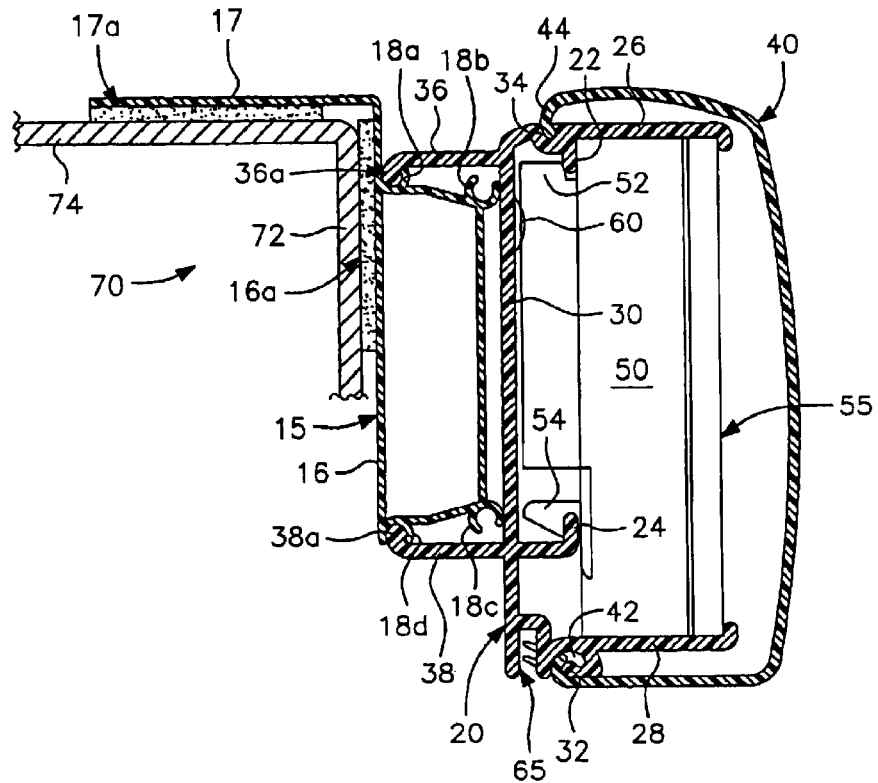
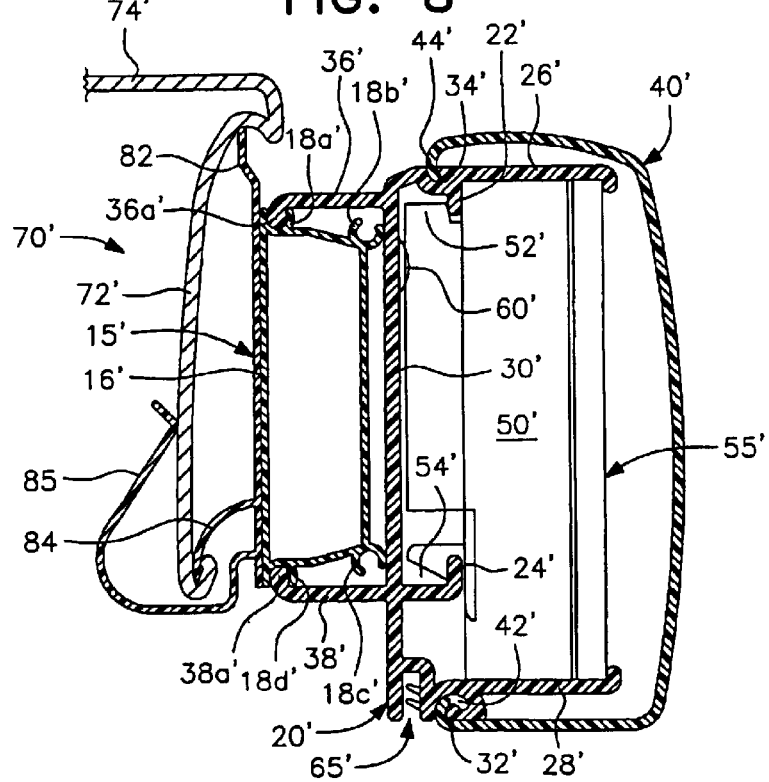

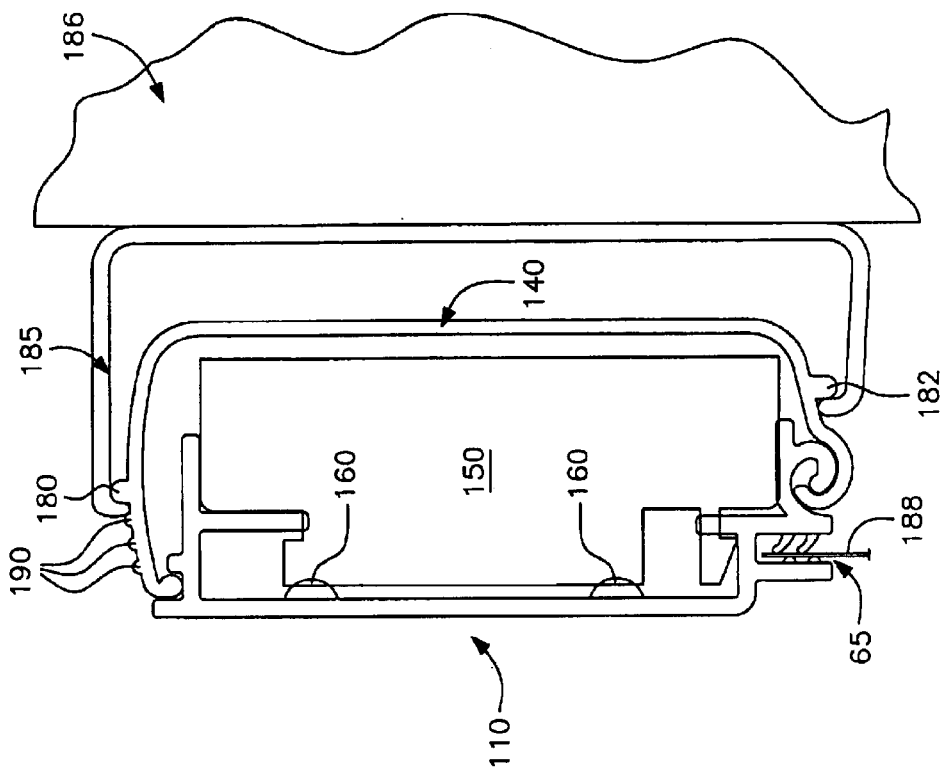
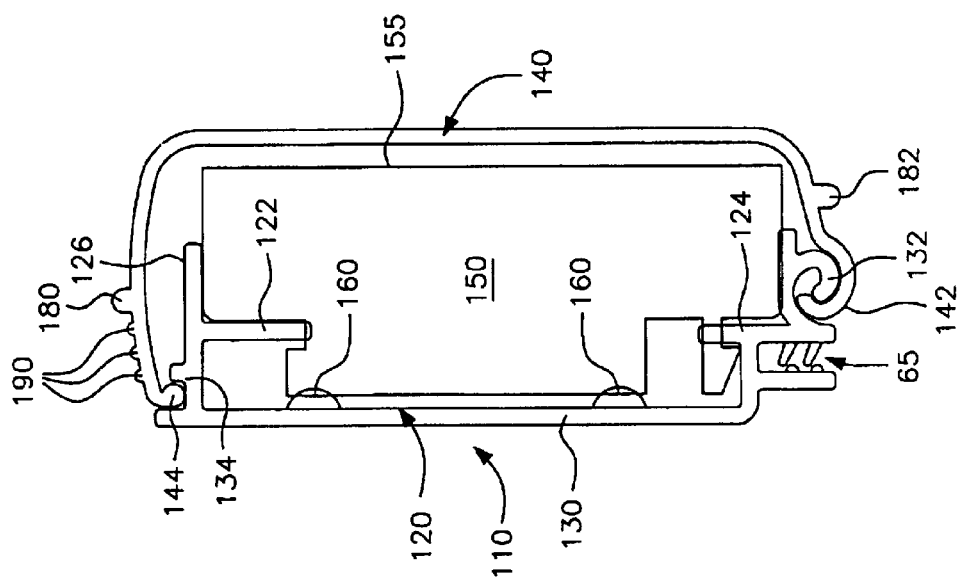

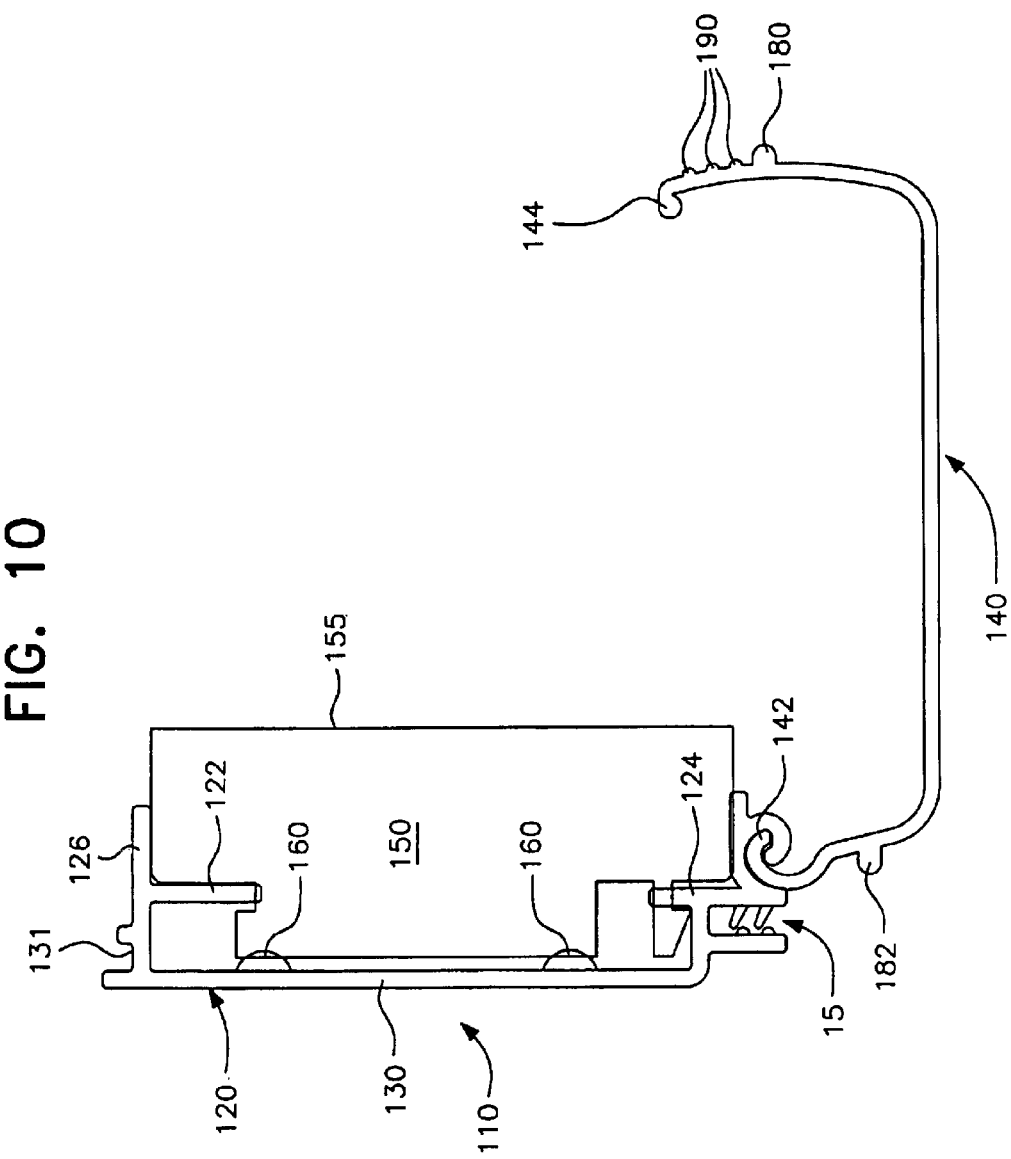

FIG. 16
FIG. 17
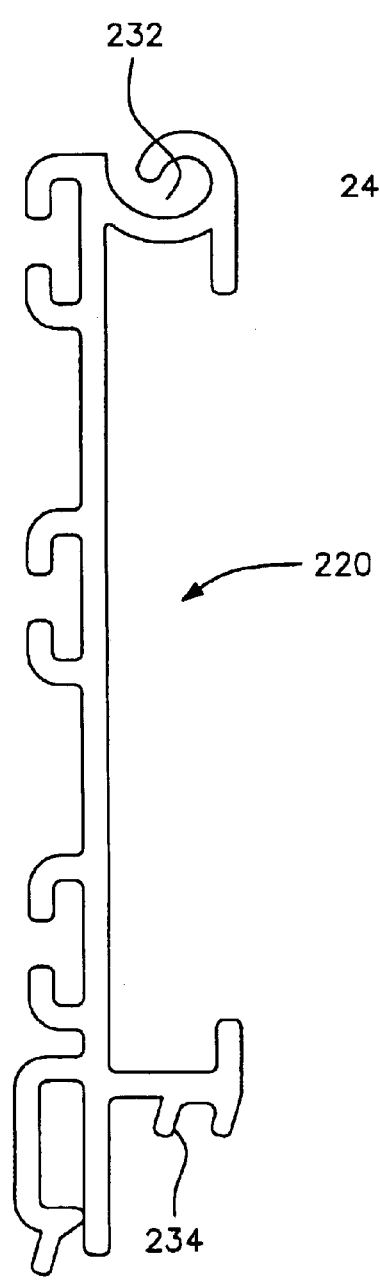
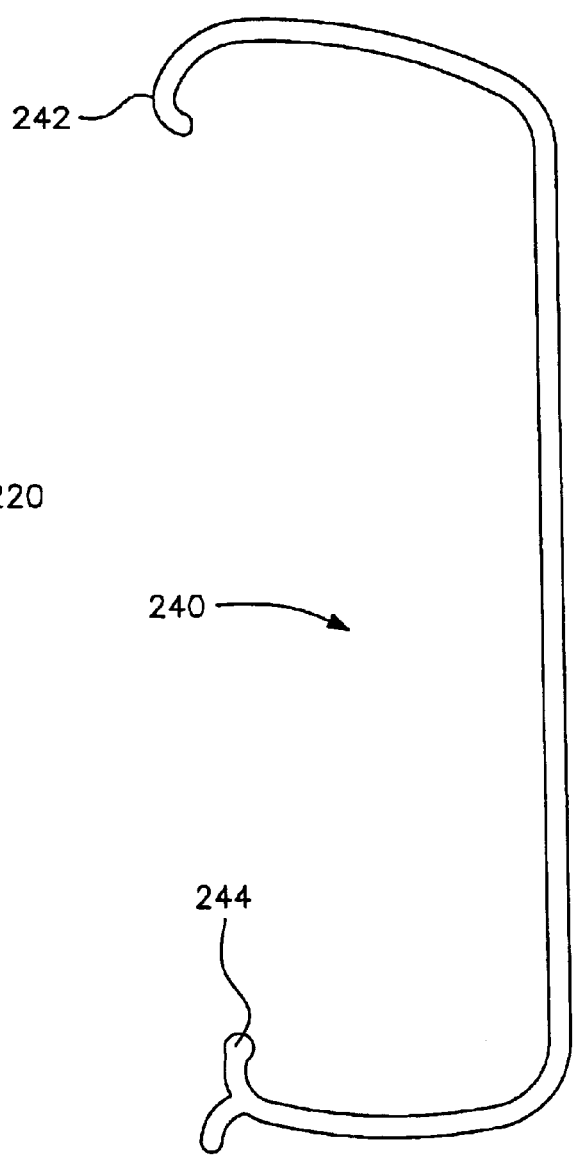

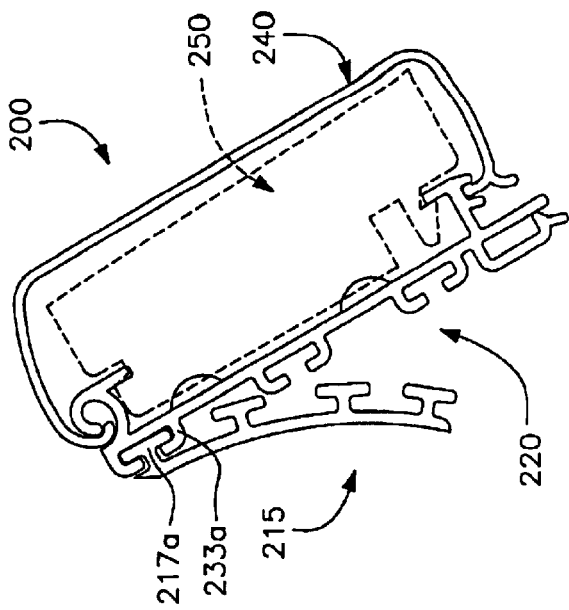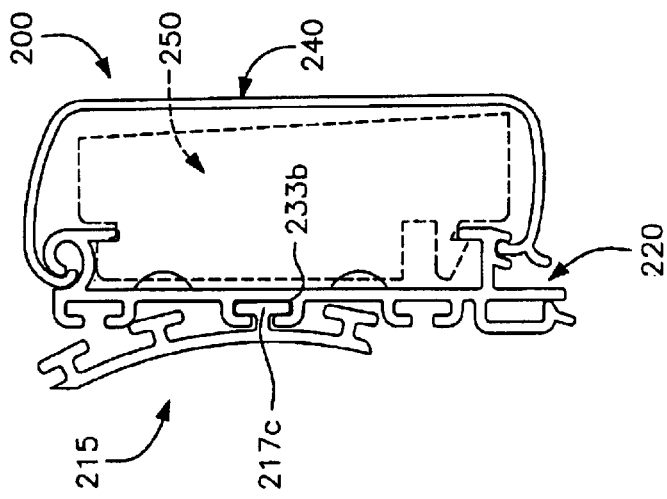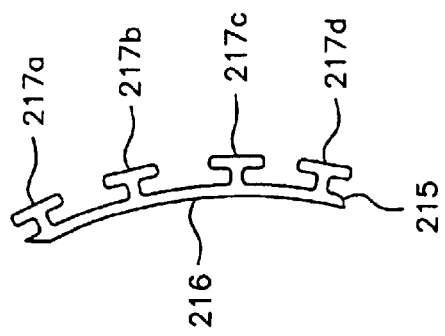

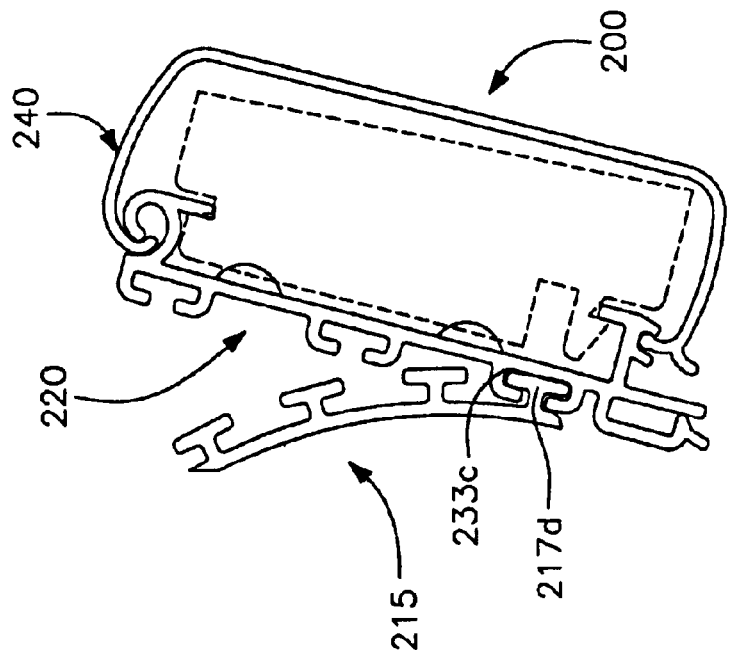
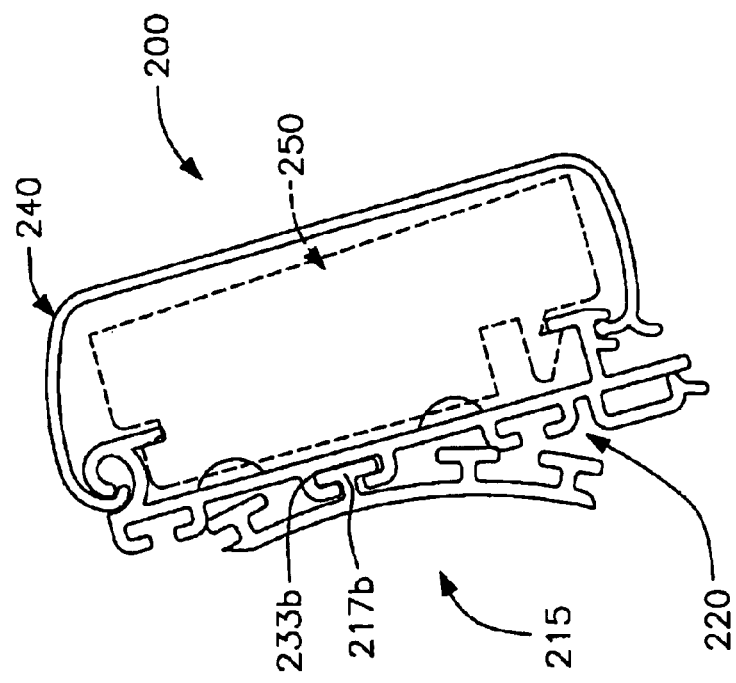

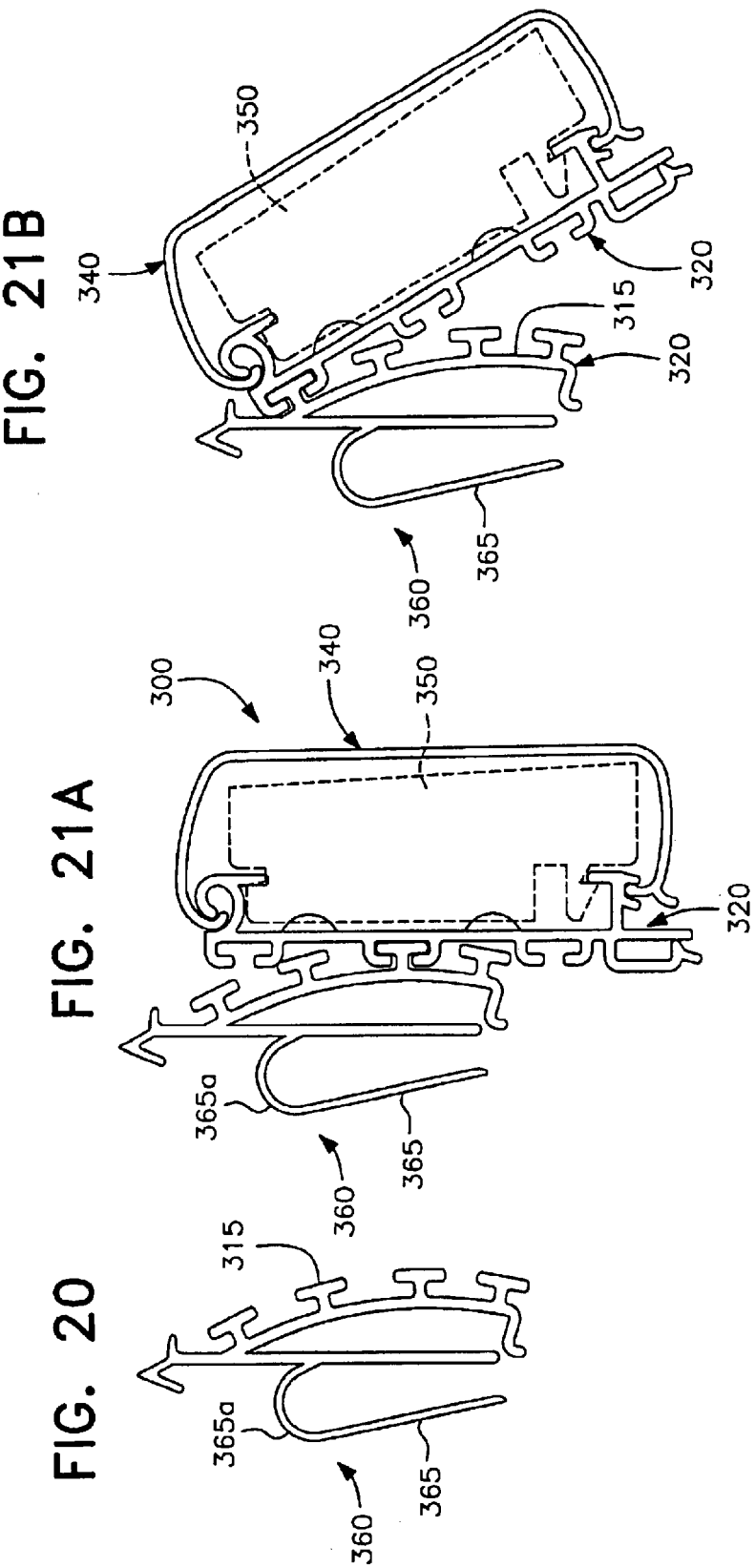

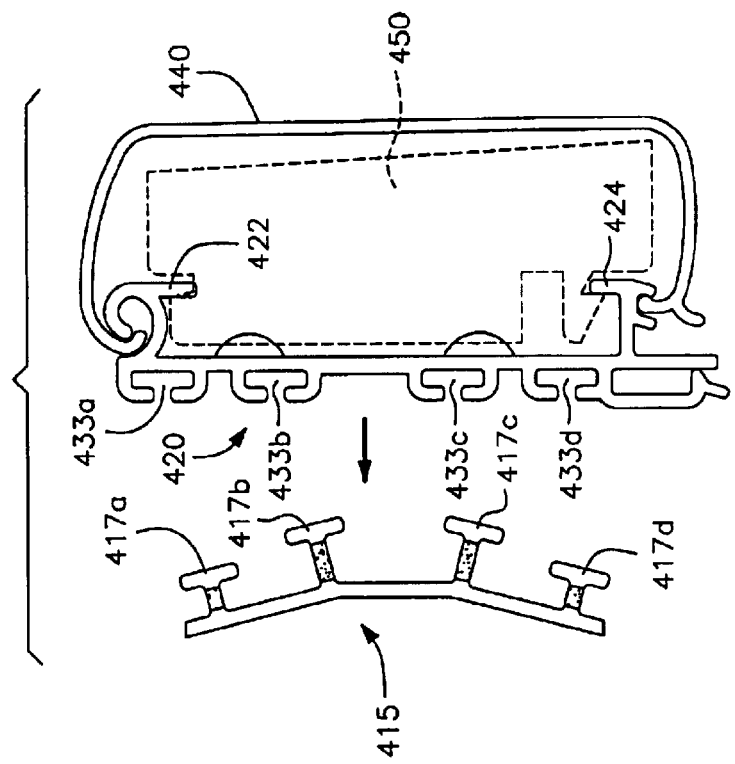
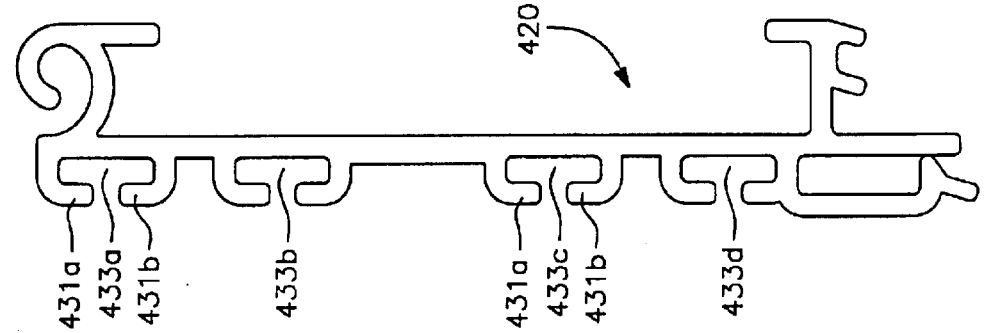
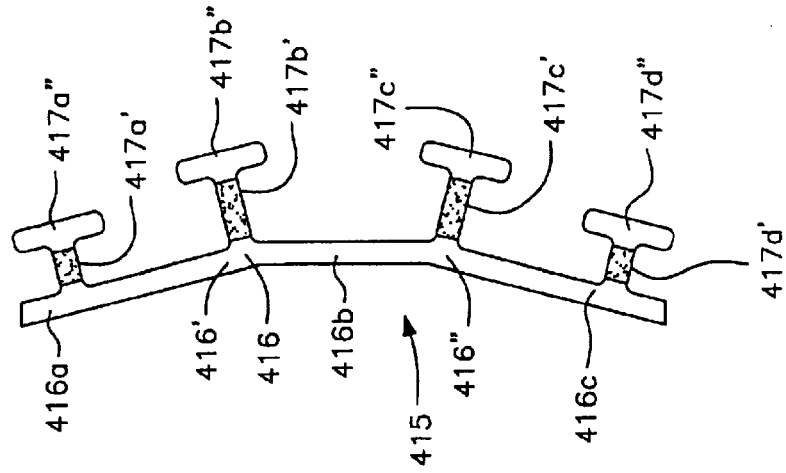

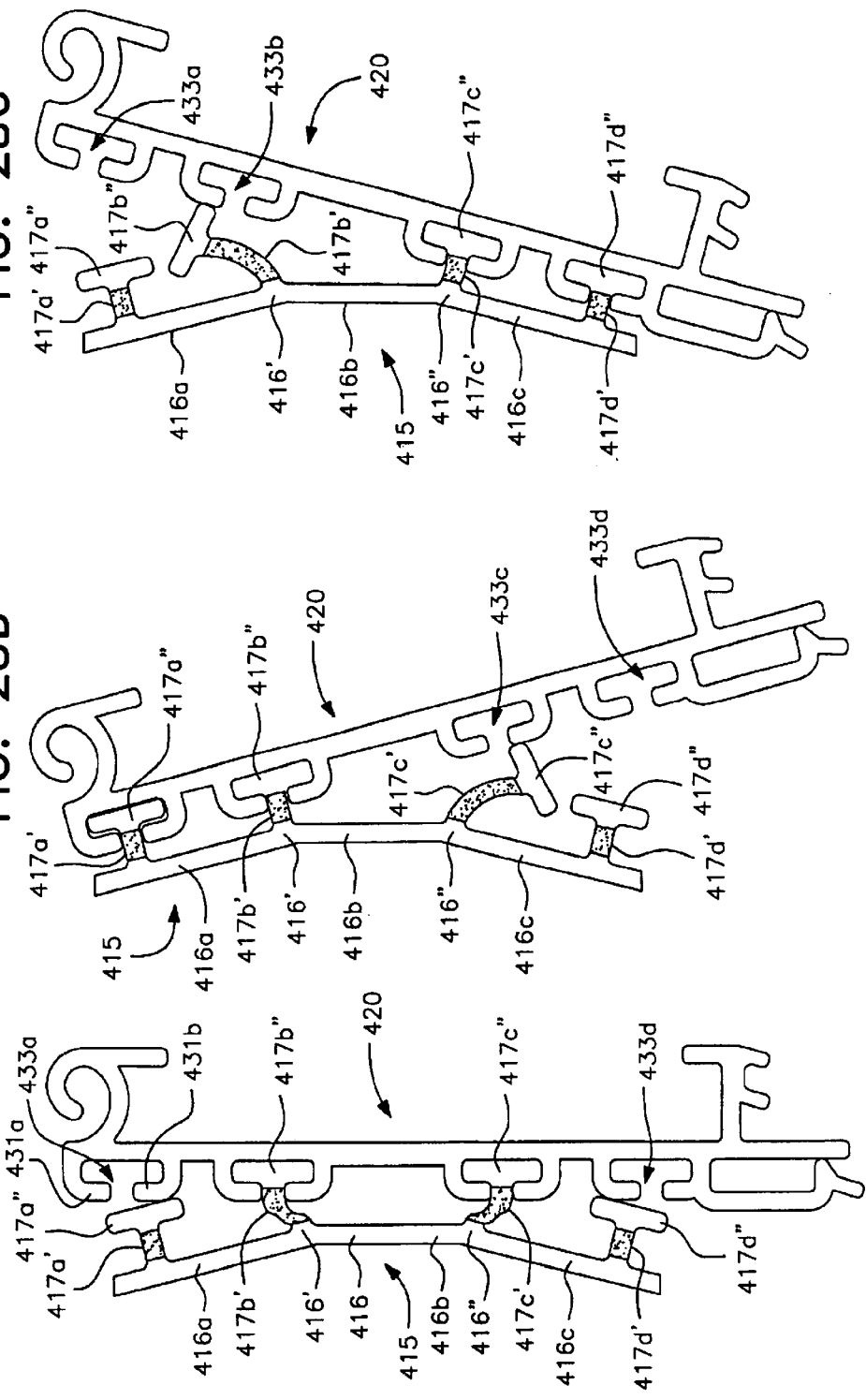

LABEL HOLDER FOR ELECTRONIC LABELING DEVICES

This is a complete application claiming the benefit of provisional application Ser. No. 60/398,730 filed Jul. 29, 2002 and provisional application Ser. No. 60/471,726 filed May 20, 2003.

BACKGROUND OF THE INVENTION

1. Field of the Invention

This invention relates to label holders and relates more particularly to holders for electronic devices generally mounted at the front of a merchandise shelf in a retail establishment to provide information regarding products carried by the shelf.

Consumer-oriented product information labels are commonly found in supermarkets, drug stores, and the like and provide purchasers with the unit price, promotional and nutritional information, and the like and, also, commonly include bar codes or other inventory control information for the use of the store personnel. Such information may be carried on paper or plastic labels secured directly to the side of a shelf unit or the front edge of a merchandise shelf, but the use of adhesively-backed labels has obvious disadvantages in the constantly changing commercial environment found in today's marketplace. More often, the front edge of the merchandise shelf is provided with an integral C-channel or the like which is adapted to either carry the labels directly or, alternatively, to carry plastic holders which are adapted to removably receive and display the labels in a well known manner. Label holders adapted for use in various environments will be seen in commonly assigned U.S. Pat. Nos. 4,625,441, 4,716,669, 5,458,307, 5,488,793, 5,515,632, 5,678,699, 5,682,698, 5,899,011 and 6,163,996, the subject matters of which are incorporated herein in their entirety by reference ("the label holder patents"). These patents are cited merely as exemplary to illustrate the many and varied forms such devices can take.

More recently, in place of, or in addition to, such paper or plastic information containing labels, electronic information carriers have been employed. Electronic shelf labels (ESLs) are generally integrated with the in-store processor (ISP) or a free-standing controller that communicates with file information supporting the store's point-of-sale system. The ESL system may include low-voltage communication electronics or communication base stations (CBS) located in store ceilings away from the store operations. The ESLs are positioned throughout the store to identify an item's retail price and other information of interest to the consumer or for use by the store's inventory system.

Price changes may be initiated through the store's controller which updates item price files. This information, which has an association to a particular product identified by item number or UPC code, is communicated to the CBS in the ceiling and transmitted via a high frequency radio signal to the corresponding ESL.

The ESLs are programmed with differing addresses that are also associated with the item number or UPC code of the product they represent. Once the addressed device is found, the label display changes and reflects an acknowledgment back to the CBS to confirm that the transmission was received and enacted. This acknowledgment is then communicated back to the ISP to complete the transaction.

These systems, such as produced by NCR under its DecisioNet™ trademark, allow the ESLs to be independent of wires and cables below the ceiling, which reduces installation time and cost. Since there are no wires or cables required from the ceiling down, the label is free to be positioned anywhere. When store shelf resets occur, ESLs move easily with the shelves.

These ESL units, however, much like paper labels, require a carrier device to facilitate supporting them at selected locations, usually on the front of a store merchandise shelf. It is ESL carriers of this type with which the instant invention is concerned.

2. Description of the Related Art

Several carriers for electronic shelf labels have been developed, including the device seen in U.S. Pat. No. 6,119,990, the subject matter of which is also incorporated herein in its entirety by reference (the '990 patent). The '990 patent recognizes some of the problems associated with ESLs, including the need to be able to adjust the orientation of the carrier, and thus, the ESL, to permit the viewer to more readily see the information, particularly if the electronic label is attached to a relatively low, or relatively high, shelf. Similar problems are associated with paper or plastic labels and a variety of holders have been developed to enable the orientation of such labels to be modified as needed. However, because of the unique construction of the ESLs, the arrangements used heretofore with paper or plastic labels are not particularly useful.

The construction proposed by the '990 patent for enabling an ESL to be carried and positioned at differing angles has a number of commercial disadvantages. In addition to being somewhat complex and, therefore, more expensive to manufacture, it is difficult to use, requiring the ESL to be removed from the carrier in order to re-orient the same at a different angle. The '990 patent adjusts the angular orientation of the ESL by rotating or sliding complementary concave and convex surfaces of adaptor and holder elements relative to each other, and then fixing the elements in a particular orientation by separate fastener elements such as dart clips, push pins or the like. Such a systems is labor-intensive, increasing the costs to the merchandiser. Moreover the use of separate fastening elements is a nuisance since such items are not integrated with the label holder and, therefore, easily dropped or misplaced.

SUMMARY OF THE INVENTION

It is a primary object of the instant invention to provide highly versatile carriers for electronic information labels, particularly adapted for supporting such elements at the front edge of a merchandise shelf to enable one or more ESLs to be positioned and repositioned in a simple and inexpensive manner.

A further object of this invention is the provision of ESL carriers which are designed to permit the user to selectively orient the face of the ESL at a desired angle depending upon the position of the ESL relative to the eye of the viewer or equipment adapted to read the information presented, either by selecting carriers pre-designed for zero angle or direct viewing, viewing from above or below the ESL, or by providing a device that can be readily adapted to adjust the viewing angle.

A still further object of this invention is the provision of a universal ESL holder and cover profile, with one of several unique base attachment elements that enable the reorientation of the ESL from a zero angle or direct viewing, to one of a select group of plus or minus angles to facilitate viewing from above or below the ESL, while minimizing the number of potential dies necessary to provide an ESL holder having such versatility.

Another object of this invention is to provide a label holder for ESLs with a base attachment element or profile having a series of projections or protuberances that can be engaged with selective complementary cavities on the holder element for the ESLs to enable a single base and holder design to accommodate selected viewing angles for the ESL either at a zero angle or a positive or negative inclination to the horizontal.

A further object of the instant inventive concepts is the provision of a device wherein the protrusions are generally T-shaped, with the stem of the T being formed of a flexible plastics material to facilitate engagement with selected cavities in the holder device to establish the viewing angle of the ESLs carried thereby.

Another object of this invention is the provision of a combination ESL holder and cover profile and base attachment element of the type described wherein at least two projections in the base attachment element are engaged in complementary cavities in the ESL holder to enhance the stability of the connection between these elements and minimize the likelihood of disengagement in the event of accidental impact from a passerby or a piece of equipment such as a shopping cart or the like.

Yet another object of this invention is the provision of a flexibly supported engagement member on the base element to act as a "shock absorber", absorbing some of the force on the assembly if the unit is accidentally impacted in use.

A further object of this invention is to incorporate the attachment element into a universal support element which includes a flexible leg member enabling the support element to accommodate different dimensions of C-channels integrally formed along the front edge of a variety of commercially available merchandise shelves known in the art as the Lozier shelf, the madix shelf and the Streater shelf.

Yet another object of this invention is to provide an electronic label holder of the type described with a transparent cover hingedly attached at the bottom or at the top to the holder so that the cover can be opened for removing, replacing or servicing ESLs carried by the device, with a hinged engagement between the holder and the cover that enables the cover to be carried by the holder even when opened, while permitting a damaged cover to be readily replaced without having to remove or replace the entire carrier and, preferably, with gripping elements on the cover adapted to simplify opening and closing the carrier cover.

A further object of this invention is to provide such a carrier device where the cover includes means adapted to removably receive sign holders or the like for providing additional information regarding selected merchandise on the shelf and which may incorporate grips to attach further flags or signs highlighting special features of the merchandise.

A still further object of this invention is the provision of a carrier device for an electronic shelf label, the principal parts of which may be formed of a relatively rigid and robust polymeric material to protect the ESL from damage in use with sections of softer and flexible polymer providing a frictional surface to preclude unintended movement of the ESL within the carrier and other sections of a more resilient polymer to provide limited flexibility and impact absorption in use.

Other and further objects, features and advantages of the invention will become apparent from the ensuing description and claims taken in conjunction with the attached drawings.

BRIEF DESCRIPTION OF THE DRAWINGS

These and other objects, features and many of the attendant advantages of the invention will be better understood upon a reading of the following detailed description when considered in connection with the accompanying drawings wherein:

FIG. 1 is a transverse cross-sectional view through one embodiment of an electronic shelf label carrier device according to this invention;

FIG. 8 is a cross-sectional view, similar to FIG. 1, through a modified ESL carrier according to this invention adapted for mounting in a C-channel or the like at the front of a merchandise shelf;

FIG. 9 is an end elevational view of an ESL carrier according to a different embodiment of the instant inventive concepts;

FIG. 9A is a view similar to FIG. 9 showing portions of a sign holder adapted to be removably carried by the cover of the ESL carrier of FIG. 9, with portions of an additional flag or the like carried by the grip at the bottom of the ESL holder member;

FIG. 10 is a view of the carrier of FIG. 9 with the cover fully opened for insertion or removal of the ESL;

FIG. 16 is a side elevational view of the holder member of this embodiment adapted to removably receive and support one or more ESL devices;

FIG. 17 is a side elevational view of the cover member therefor;

FIG. 18 is a side elevational view of one form of unique attachment member for use with the ESL carrier of FIGS. 14–17;

FIGS. 19A–19D show the ESL carrier of FIGS. 14–17 arranged for zero-angle viewing, 30° up tilt, 15° up tilt and −15° up tilt, respectively, utilizing the attachment member of FIG. 18;

FIG. 20 is a side elevational view of a universal C-channel support element incorporating an attachment member of the type seen in FIG. 18;

FIGS. 21A–21D show the ESL carrier of FIGS. 14–17 arranged for zero-angled viewing, 30° up tilt, 15° up tilt and −15° up tilt, respectively, on the universal C-channel support element of FIG. 20;

FIG. 25 is an enlarged side elevational view through a modified attachment member for use with an ESL carrier according to preferred embodiments of this invention;

FIG. 26 is a side elevational view of a holder member particularly adapted for use with the attachment member of FIG. 25;

FIG. 27 is an exploded view showing the manner in which the attachment member of FIG. 25 can be engaged with the holder member of FIG. 26; and FIGS. 28A–28C show the ESL carrier of FIGS. 25–27 arranged for zero-angled viewing, 15° uptilt and −15° uptilt, respectively.

Like reference characters refer to like parts throughout the several views of the drawings.

DETAILED DESCRIPTION OF THE PREFERRED EMBODIMENTS

Figure 2:
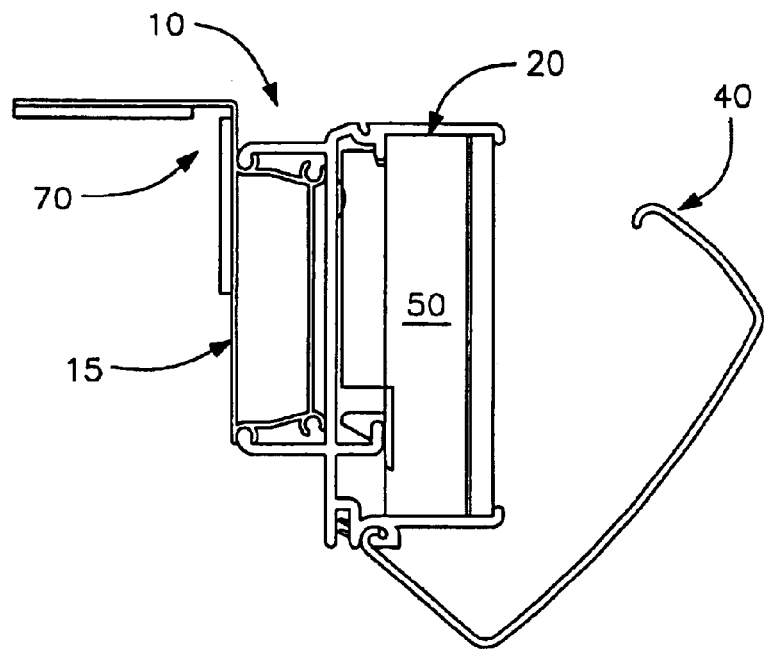
FIG. 2 is a view of the holder of FIG. 1 showing the transparent cover partially opened.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring now to the drawings, and more particularly to FIGS. 1–7, one embodiment of an electronic shelf label (ESL) carrier according to this invention is designated generally by the reference numeral 10 and is comprised, basically, of three parts, an attachment member 15, a holder member 20 adapted to removably receive and support one or more ELS devices as discussed below, and a cover member 40. Each of these elements are formed in any conventional manner, as by extrusion, of any suitable polymeric material. Those with ordinary skill in the art can readily select the appropriate manufacturing method and material which are not critical to the instant inventive concepts.

The holder member 20 is preferably formed of a relatively rigid opaque plastic material and is sufficiently robust to receive and carry one or more ESL devices shown schematically at 50, the specific construction of which is also not a part of this invention. Regardless of the design of the ESL device 50, it will ordinarily have protruding portions such as shown at 52, 54 and the member holder 20 will incorporate complementary fingers or the like 22, 24 which, together with the top and bottom portions 26, 28 and the back 30, secure the ESL device 50 therewithin.

It is to be understood that the design of the ESL device will dictate the configuration of the interior of the holder member 20 which will include complementary fingers or undercuts, as necessary, to enable the ESL devices to be snapped into engagement with the holder member 20, or slid lengthwise along the holder member 20 from an end thereof, to position the ESLs at a point on the shelf front juxtaposed to the merchandise to which they relate.

Figure 3:
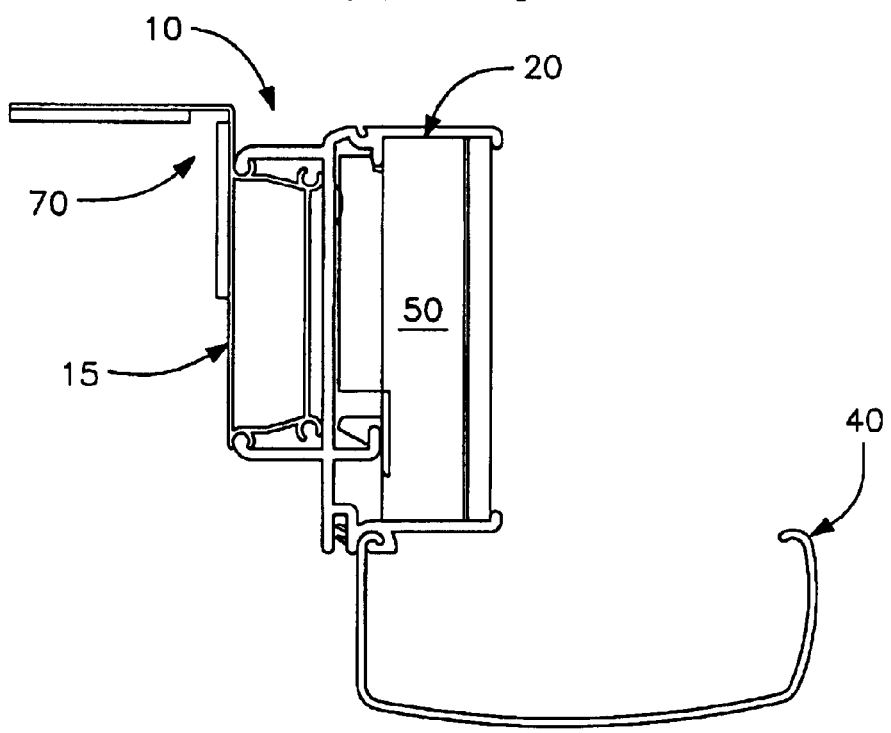
FIG. 3 is a view similar to FIG. 2 showing the transparent cover fully opened for removing, replacing or servicing an ESL carried thereby.

The cover member 40 is preferably extruded in a clear polycarbonate or other such material resistant to damage when struck by objects such as shopping carts or the like, and is adapted to be slid onto the end of the holder member 20 across its length. More specifically, the holder member 20 is provided with a depending pivot element 32 which engages with a C-shaped element 42 at the lower end of the cover member 40 to permit the cover member 40 to be hingedly rotated about the pivot member 32 in the manner shown in FIGS. 2 and 3 to access the interior of the holder member 20 to remove, replace, service or move an ESL device 50 therewithin. While the cover member 40 can be opened and closed at will, and normally remains with the holder member 20 as seen in FIG. 3 to avoid the need for totally removing the cover member while servicing an ESL, the cover member 40 is preferably not integral with the holder member 20 so that the cover member 40 can be independently replaced if it is damaged, avoiding the need to replace the entire carrier device 10.

The upper end of the cover member 40 includes a finger or hook 44 which can be snapped into a detent 34 in the top 26 of the holder member 20. This design is not only simple and inexpensive to manufacture, but protects the ESL device from physical damage and, also, limits the entry of dust or other extraneous undesirable material from accessing the interior of the holder member 20.

Figure 4:
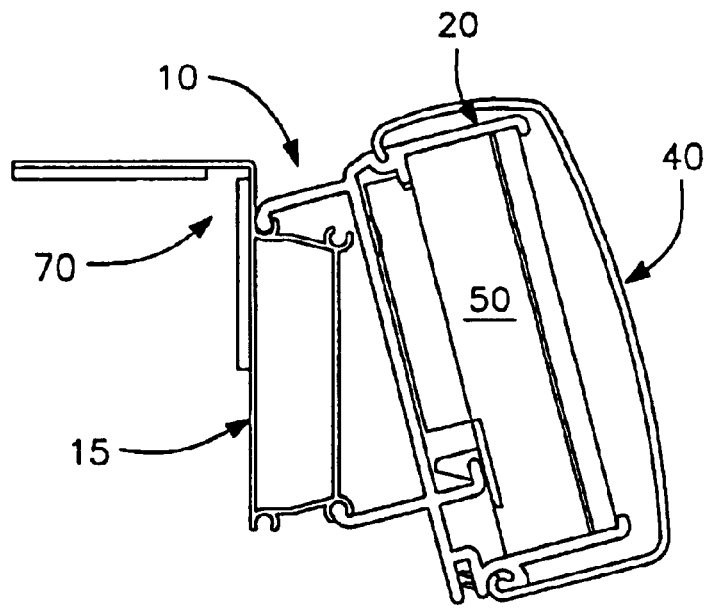
FIG. 4 shows the carrier of FIG. 1 reoriented to display the ESL at a positive angle for use, particularly, when the ESL is to be viewed from above.
Figure 5:
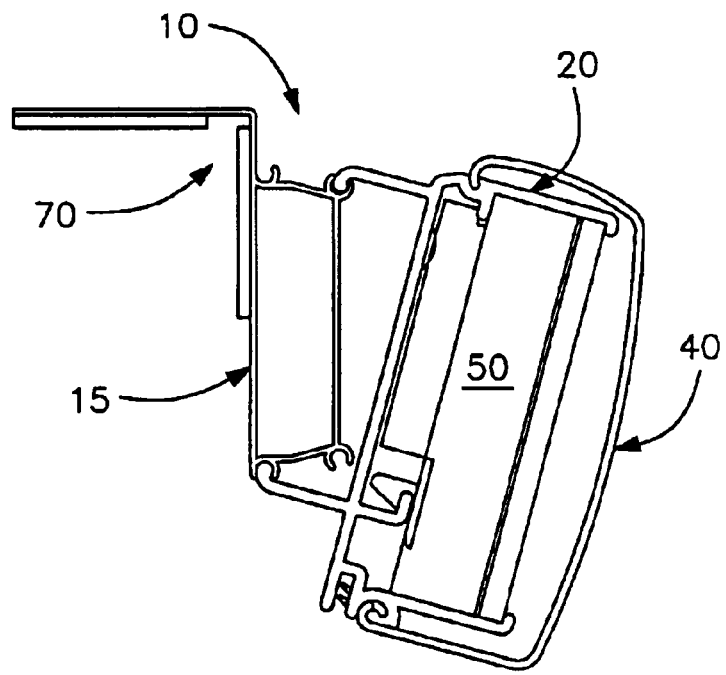
FIG. 5 is a similar view of FIG. 1, with the ESL oriented at a negative angle for use, particularly, when the ESL is to be viewed from below.
Figure 6:
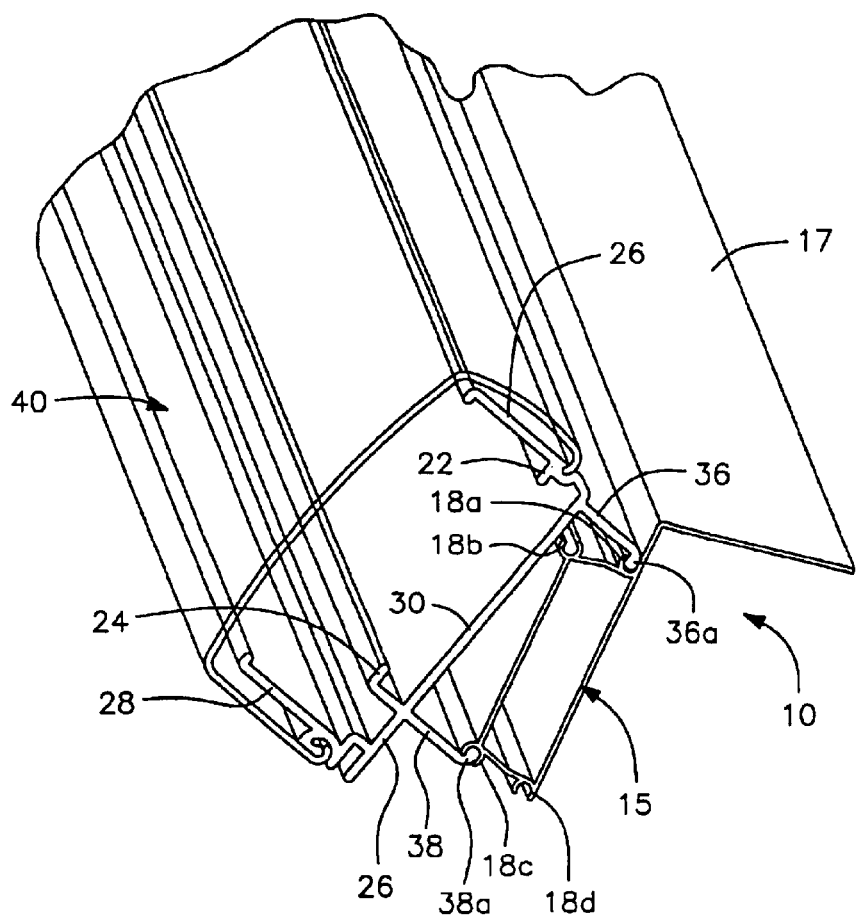
FIG. 6 is a partial end perspective view of the ESL carrier of FIG. 1, oriented at a positive angle as seen in FIG. 4.
Figure 7:
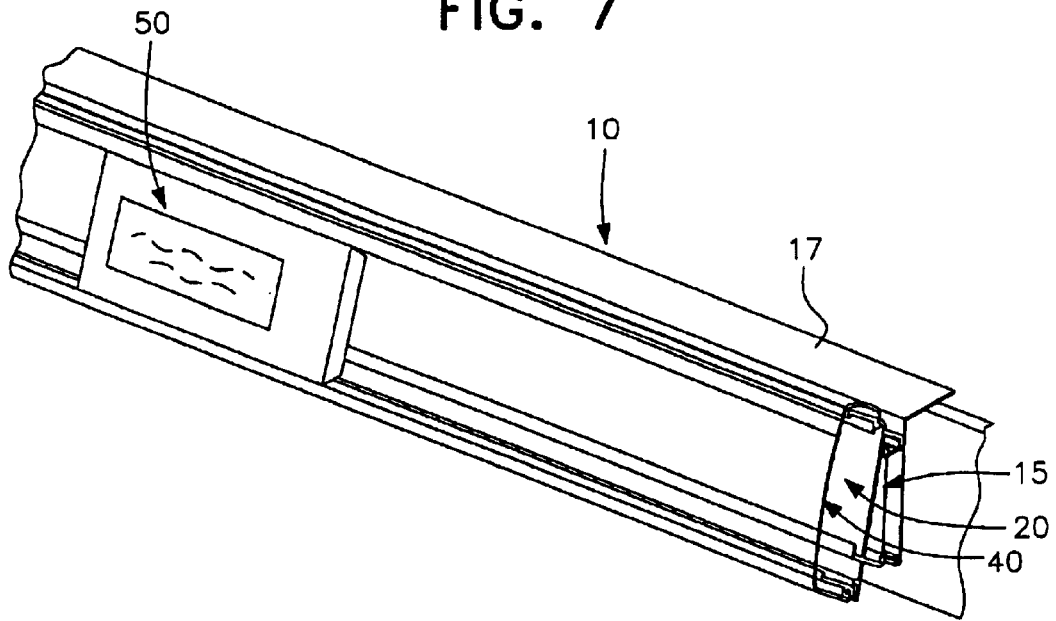
FIG. 7 is a front perspective view of an ESL carrier in use.

A particularly unique portion of this embodiment of the instant invention is the attachment device 15 which includes a mounting portion or backing element 16 and four separate resilient cup-shaped elements 18a, 18b, 18c and 18d, respectively, adapted to interact with complementary protrusions 36a, 38a on the ends of upper and lower finger members 36, 38, extending rearwardly from the back 30 of the ESL holder member 20. By comparing FIG. 1, with FIGS. 4 and 5, it can be seen that, by selectively engaging the protrusions 36a, 38a in the cup-shaped connectors 18a, 18b, 18c or 18d, the front surface 55 of the ESL device can be oriented either vertically as seen in FIG. 1, at about a positive 15° angle as seen in FIG. 4, or at about a negative 15° angle as seen in FIG. 5.

It is to be understood that, while four cup-shaped connectors 18a, b, c and d are illustrated, additional connectors can be included to provide the carrier 10 with greater versatility. Moreover, while the connectors 18b and 18c have been designed to provide a negative and positive 15° angle orientation, respectively, by simple repositioning of these connectors, other angular orientations can be provided.

The use and operation of an ESL carrier 10 according to this invention will now be readily understood by those with ordinary skill in the art. The carrier 10 is shown as attached to a shelf 70 comprising a substantially vertically extending front edge 72, and a generally horizontally extending support portion 74 adapted to carry merchandise (not shown) for display. Shelves of this general nature are commonly used in supermarkets and the like in Europe and elsewhere. For use with such shelves, the attachment element 15 of the ESL carrier 10 shown in FIG. 1 is simply provided with a horizontally extending portion 17 and adhesive tapes 16a and 17a to secure the attachment member 15 to the front edge 72 and support portion 74, respectively, of the shelf 70 in an obvious manner.

With the protrusions 36a, 38a snappingly engaged in the upper and lower rear cup-shaped connectors 18a, 18d as seen in FIG. 1, the ESL device 50 is positioned with its front surface 55 substantially vertically oriented, or at a 0° angle with respect to the front edge 72 of the shelf 70. However, by engaging the lower protrusion 38a in the front lower cup-shaped connector 18c as seen in FIG. 4, the front face 55 of the ESL device 50 is oriented upwardly, in this instance at approximately a 15° angle relative to the front edge 72 of the shelf 70. Such an orientation is particularly useful for shelves that are below the viewing area of the user. Alternatively, by engaging the upper protrusion 36a in the front upper cup-shaped connector 18b as seen in FIG. 5, the ESL device 50 may be oriented at a negative angle relative to the front edge 72 of the shelf 70, an arrangement particularly useful if the ESL device 50 is to be positioned at a level above that of the ordinary viewer.

Thus, it can be seen that, with the attachment device 15 of this invention, the ESL 50 can be oriented and reoriented without removing the ESL device 50 from the holder member 20 and with a minimum of time and effort. The cover member 25 can be readily opened for servicing, removing or replacing an ESL device at will and then snapped back in position to protect the ESL from damage, while permitting visual and/or electronic access to the ESL device by a viewer.

A small section or rib of flexible polymer, such as polyvinyl chloride, for example, is shown at 60 and can be provided on the inside surface of the rear wall 30 of the holder member 20 to interact with the rear surface of the ESL device and preclude the ESL device from sliding horizontally within the holder 20.

Additionally, a sign holder or grip designated generally by the reference numeral 65 can be provided at the bottom of the ESL holder member 20 to support a promotional sign or the like in an obvious manner.

The length or height of an individual section of a carrier device may vary within the scope of this invention. For most applications, however, the device is dimensioned to reflect the size of the ESL and marketed in four foot lengths for attachment to the front of a merchandise shelf.

Although a simple adhesive tape arrangement is shown in the embodiment of FIGS. 1–7 to secure the carrier 10 to a shelf 70, other mounting means may be readily integrated into the carrier 10 of this invention without departing from the instant inventive concepts. As an illustration, a modified mounting portion is shown in FIG. 8 with parts similar to those of the embodiment of FIGS. 1–7 designated by the same reference numeral followed by a prime ('). In this embodiment, the rear or back 16' of the attachment member 15' is provided with upper and lower fingers 82, 84 for engagement in a C-channel 72' at the front of a shelf 70' with a resilient lower element 85 engaging under and behind the front edge 72' of the shelf 70'.

Referring now to FIGS. 9–13, a simplified, two-part ESL carrier is designated generally by the reference numeral 100, with parts similar to the elements in the embodiment of FIGS. 1–7 bearing the same reference numeral, but in the 100 series. For example, the ESL carrier 10 of FIG. 1 is identified by the reference numeral 110 in FIG. 9, the holder member 20 of FIG. 1 is replaced by the holder member 120 in FIG. 9, and the cover member 40 in FIG. 1 is replaced by the cover member 140 in FIG. 9. In the embodiments of FIGS. 9–13, the universal attachment member 15 of the earlier embodiments is eliminated and replaced with carriers specifically designed for either a zero degree viewing (FIGS. 9, 9A, 10 and 11A–11D), a positive viewing angle (FIGS. 12A–12D) or a negative viewing angle (FIGS. 13A–13D).

With respect to the zero degree embodiments of FIGS. 9, 9A, 10 and 11A–11D, the rear 130 of the ESL holder member 120 can be attached to a supporting surface (not shown) in any conventional manner, e.g., by adhesive strips (not shown), C-channel engaging elements such as illustrated in FIG. 8, or other conventional attaching means as seen in the above-identified label holder patents and elsewhere.

The cover member 140 of these embodiments preferably has a pair of oppositely extending enlarged protrusions or fingers 180, 182 adapted to snappingly receive a separate sign holder or the like schematically illustrated at 185 in FIG. 9A. Devices of this type are well known and take many configurations, but generally carry a sign or the like 186 to protrude from the cover member 140 to provide special information regarding merchandise carried on the shelf at a particular location, such as notice of a sale or the like. Similarly, an additional information-bearing flag or the like as shown schematically at 188 can be secured in the grip 165 at the bottom of the carrier 110.

An additional feature of the cover member 140 is a multiplicity of small bumps or ridges 190 behind the protrusion 180 to facilitate gripping the cover member 140 to release the upper finger or hook 144 from its engagement in the detent 134 on the top 126 of the holder member 120.

Figure 11A:
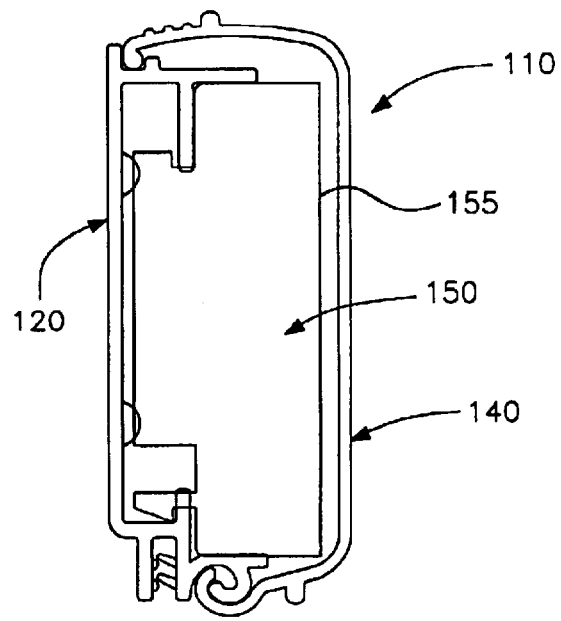
FIGS. 11A–11D show the carrier of FIG. 9 arranged for zero-angle viewing, with the cover moving from the fully closed position in FIG. 11A to the fully opened position in FIG. 11D.
Figure 11B:
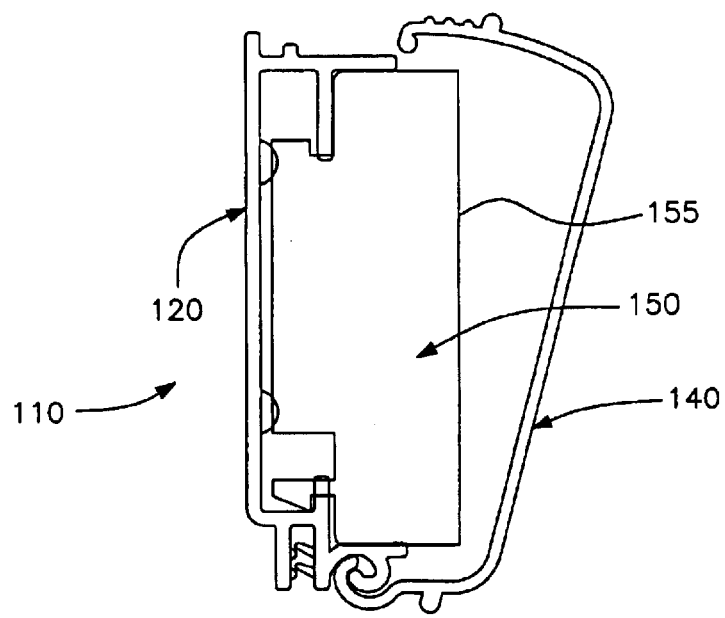
Figure 11C:
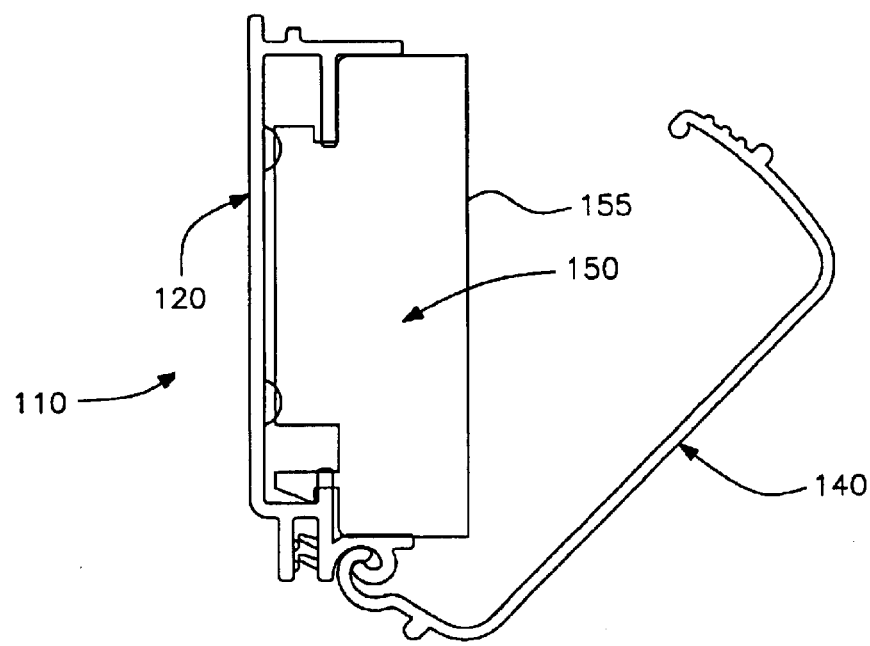
Figure 11D:
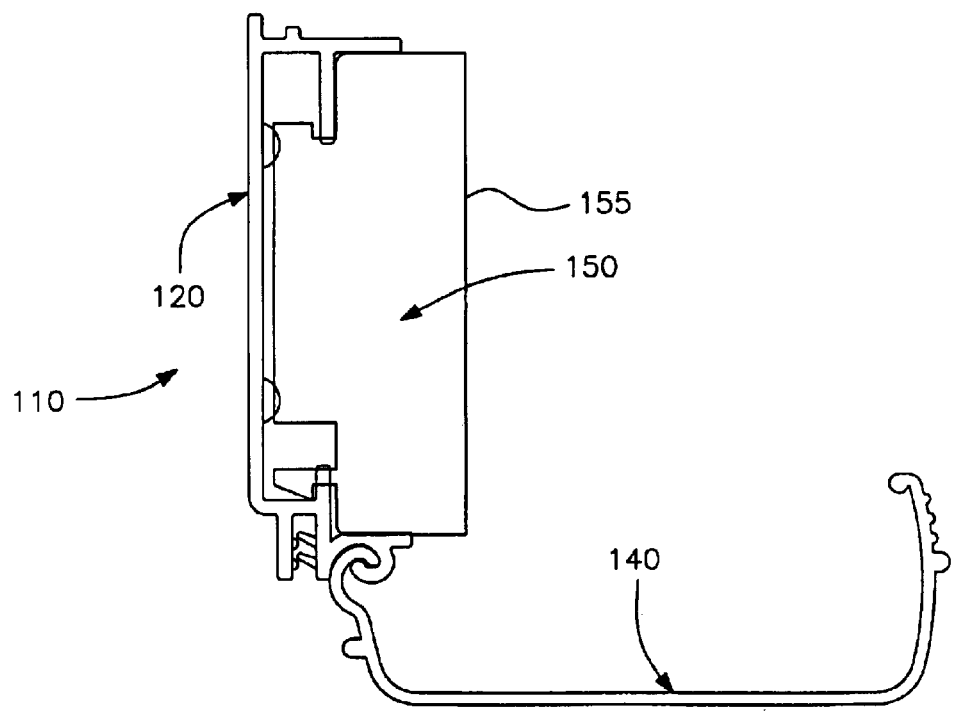
Figure 12A:
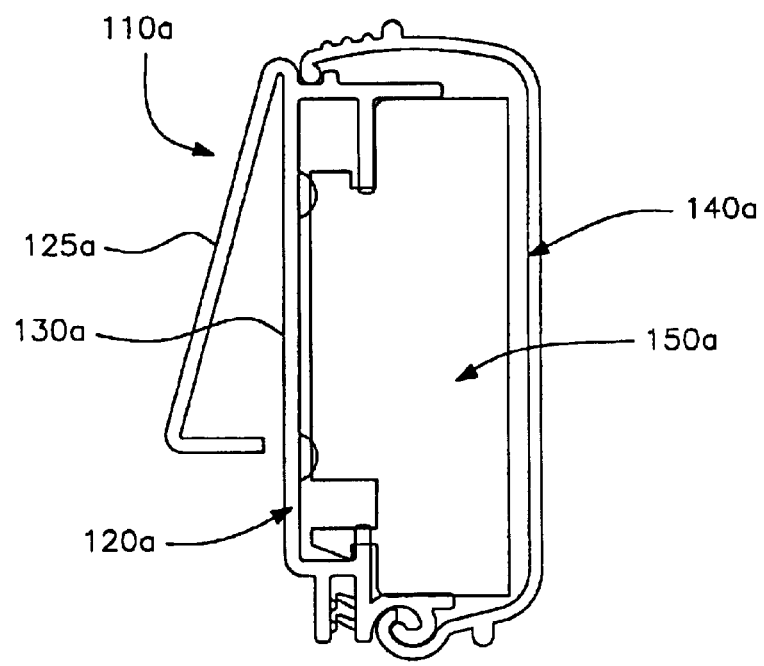
FIGS. 12A–12D are similar views of a modified carrier device designed to present the information on the ESL face at an upwardly directed angle for use on a shelf below the viewing angle.
Figure 12B:
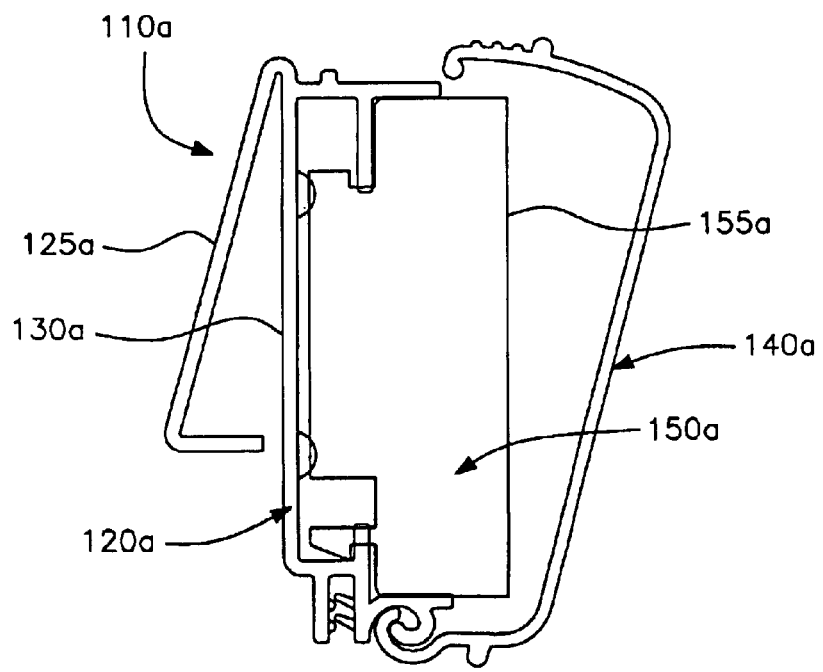
Figure 12C:
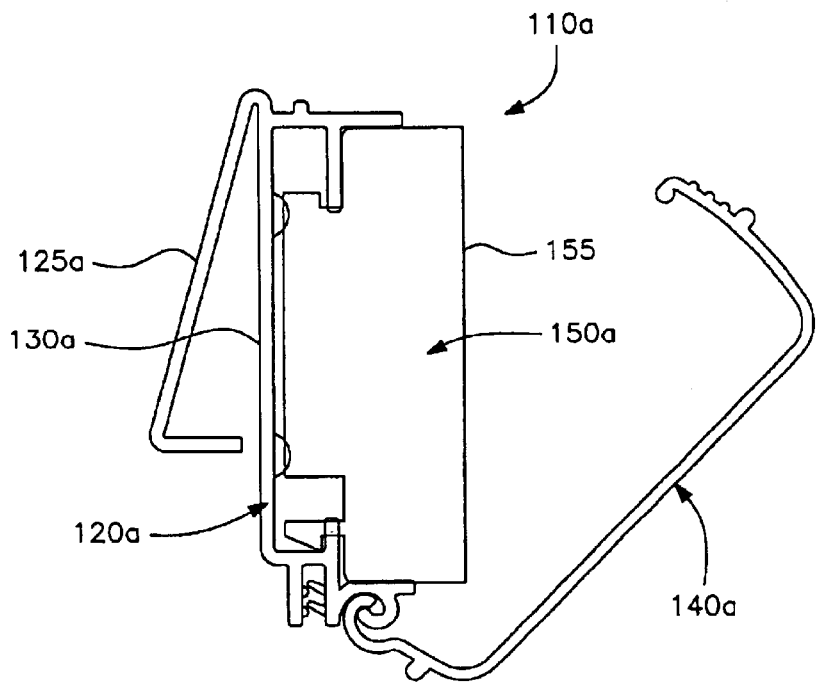
Figure 12D:
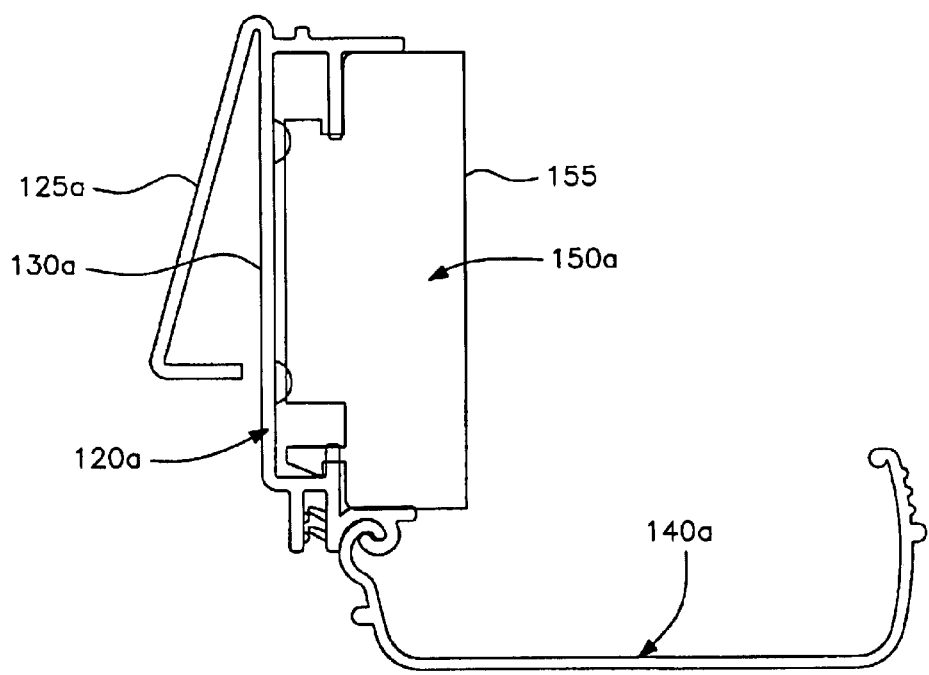
Figure 13A:
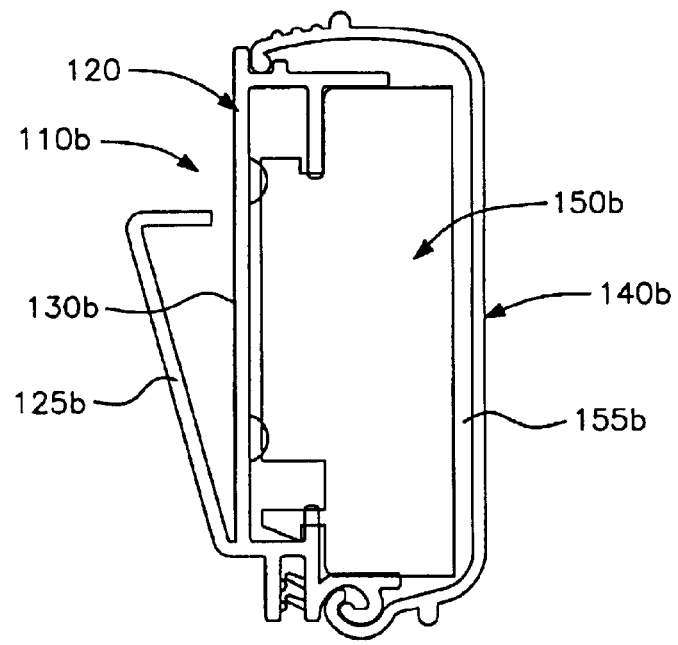
FIGS. 13A–13D are similar views of an alternate carrier device designed to present the information on the ESL face at a downwardly directed angle for use on a shelf above the viewing angle.
Figure 13B:
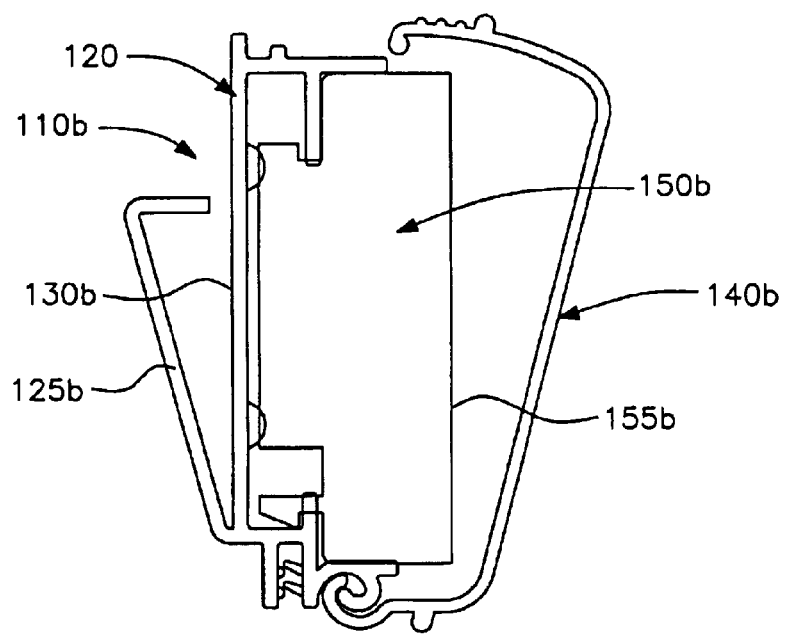
Figure 13C:
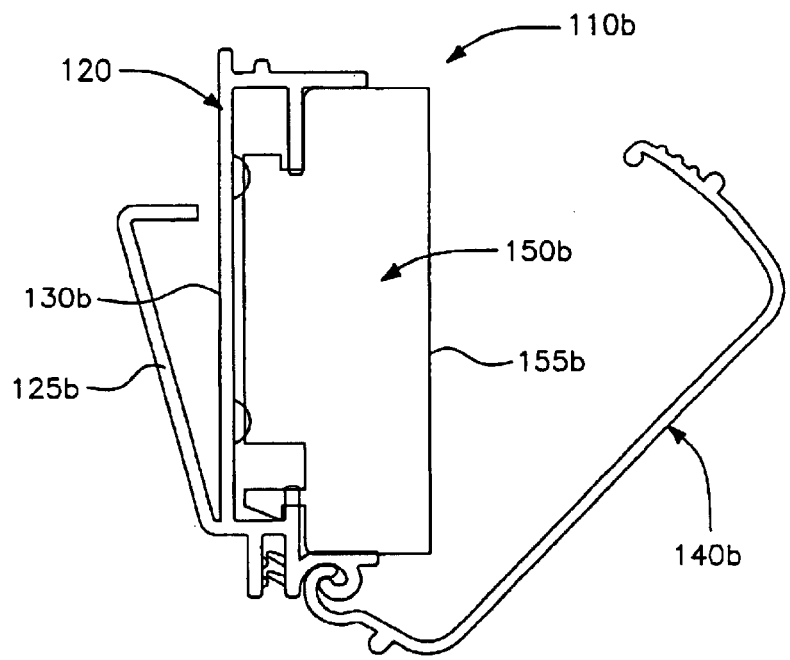
Figure 13D:
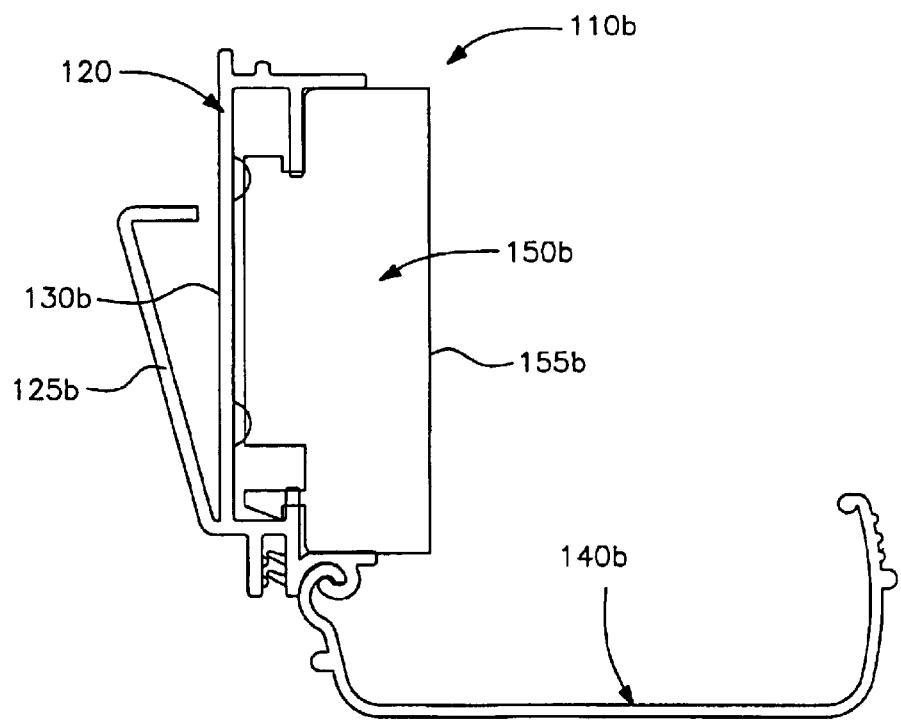
Figure 14:
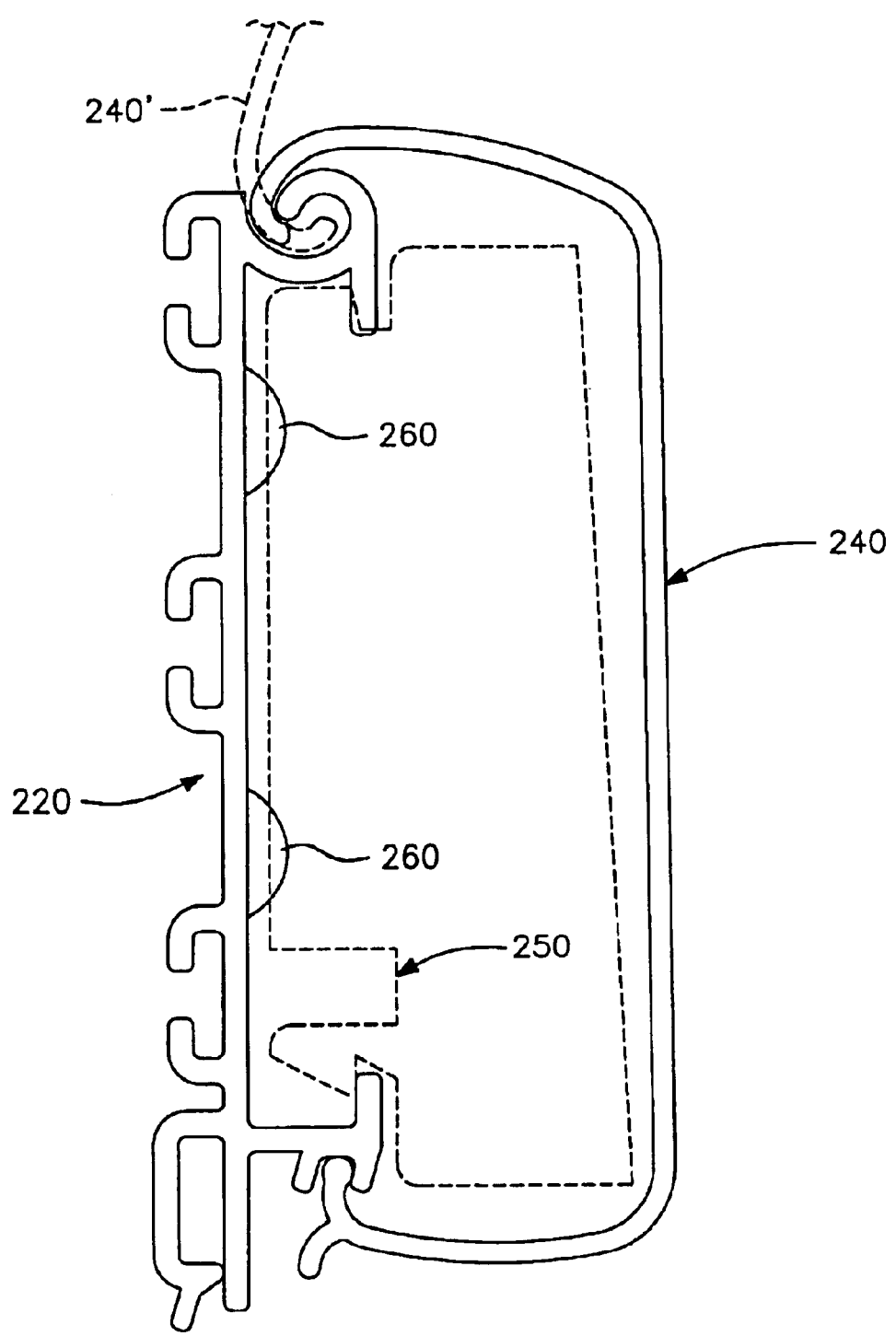
FIG. 14 is a side elevational view through yet another embodiment of an ESL carrier with a hinged cover that opens at the top, the outline of an ESL and a portion of the cover in the opened position being shown in dotted lines.

The embodiment of FIGS. 9, 9A, 10 and 11A–11D is adapted for zero degree viewing, that is, for mounting on a surface with the front 155 of the ESL 150 generally vertical. In FIGS. 11A–11D, the sequence of movements of the cover member 140 between the closed position of FIG. 11A and the fully opened position of FIG. 11D is schematically shown to facilitate an understanding of the manner in which this device is used during insertion, movement or replacement of one or more ESL devices 150.

A modified device adapted to provide a positive angle to the face 155 of the ESL 150, in the illustrated embodiment at about 15° upwardly from the vertical, is shown at 110a in FIGS. 12A–12D, wherein parts similar to those of the ESL carrier 110 are designated by the same reference numerals followed with a suffix "a". This embodiment includes an offset-angled supporting element 125a fixed to the top of the back 130a of the holder member 120a to automatically position the front face 155a of the ESL device 150a at an upwardly-inclined angle to facilitate viewing the same from above when the rear surface of the element 125a is secured to a supporting surface (not shown) in a vertically extending relationship.

In the embodiments of FIGS. 13A–13D, wherein similar parts are designated with the same reference followed by a suffix "b", the angled element 125b is secured to the bottom of the back 130b of the ESL holder 120b to present the face 155b of the ESL device 150b at a downwardly-inclined angle for viewing from below.

Referring now to FIGS. 14–19, a still further modified ESL carrier is designated generally by the reference numeral 200, with parts similar to the elements in the previous embodiments bearing the same reference numeral, but in the 200 series. The ESL carrier according to this embodiment is also comprised, basically, of three parts, an attachment member 215, seen particularly in FIG. 18, a holder member 220, seen particularly in FIG. 16, adapted to removably receive and support one or more ESL devices, and a cover member 240, seen particularly in FIG. 17.

The holder member 220 incorporates complementary fingers or the like 222, 224 designed to secure an ESL device as shown in dotted lines at 250 in a manner similar to the earlier embodiments. The cover member 240 in this embodiment includes an arcuate finger 242 adapted to rotatably engage in a pivot element 232 at the top of the holder member 220, with a finger or hook 244 at its lower end which can be snapped into a detent 234 in the bottom of the holder member 220. Thus, in this embodiment, the cover member 240 can be opened by pivoting the same upwardly about engagement of the arcuate member 242 in the pivot element 232 as partially shown in dotted lines at 240' in FIG. 14.

A particularly unique feature of this embodiment is the manner in which the attachment member 215 interengages with the holder member 220 to adjust the viewing angle of the ESL 250. In its simplest form seen in FIGS. 18 and 19, the attachment member 215 comprises an arcuate element 216 with a multiplicity of spaced T-shaped protrusions, four of which are shown at 217a, 217b, 217c and 217d, although the number of protrusions can obviously be modified without departing from the instant inventive concepts. The back 230 of the ESL holder member 220 includes a plurality of spaced pairs of upper and lower fingers 231a, 231b which define between them T-shaped cavities, three of which are illustratively shown at 233a, 233b and 233c, adapted to selectively receive one of the T-shaped protrusions 217 on the attachment member 215 as discussed below.

Thus, as can be seen in FIG. 19A, with the T-shaped cavity 233b of the holder member 220 either snapped or slid over the T-shaped protrusion 217c, the ESL carrier 250 is provided with a zero degree of tilt. By engaging the T-shaped cavity 233a with the T-shaped protrusion 217a, a 30° up tilt is provided as seen in FIG. 19B; by engaging the T-shaped cavity 233b with the T-shaped protrusion 217b, a 15° up tilt is provided; and by engaging the T-shaped cavity 233c with the T-shaped protrusion 217d, a −15° up tilt is provided.

Obviously, other shapes of protrusions and cavities may be provided, different protrusions and cavities shown in the drawings may be interengaged, and more or less protrusions and cavities may be provided on the attachment member 215 and the ESL holder member 220, respectively, to alter the available viewing angles for the ESL device.

Figure 15:
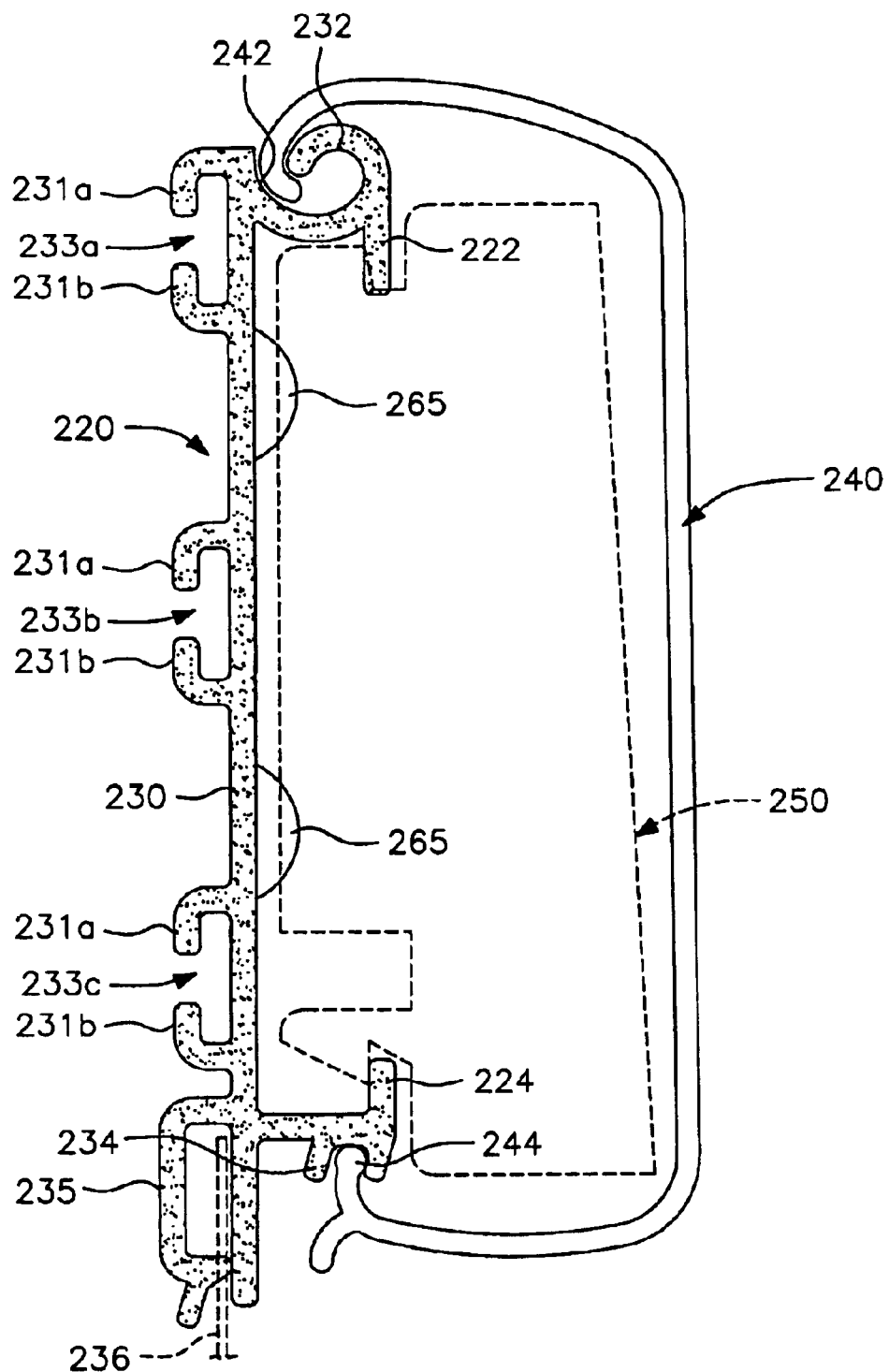
FIG. 15 is an enlarged view of the ESL carrier of FIG. 14, with a portion of a "flag" or the like carried by a lower grip being shown in dotted lines.
Figure 21C:
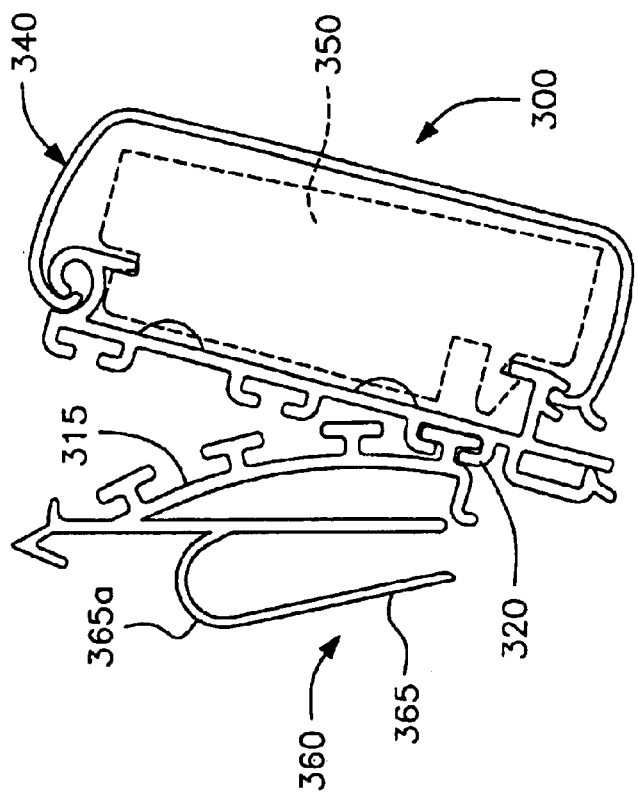
Figure 21D:
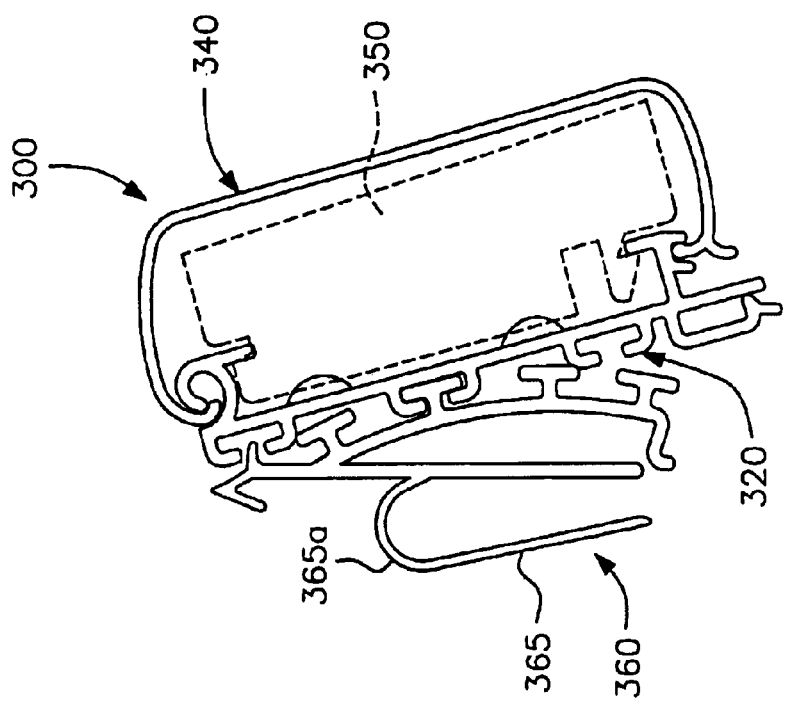
Figure 22:
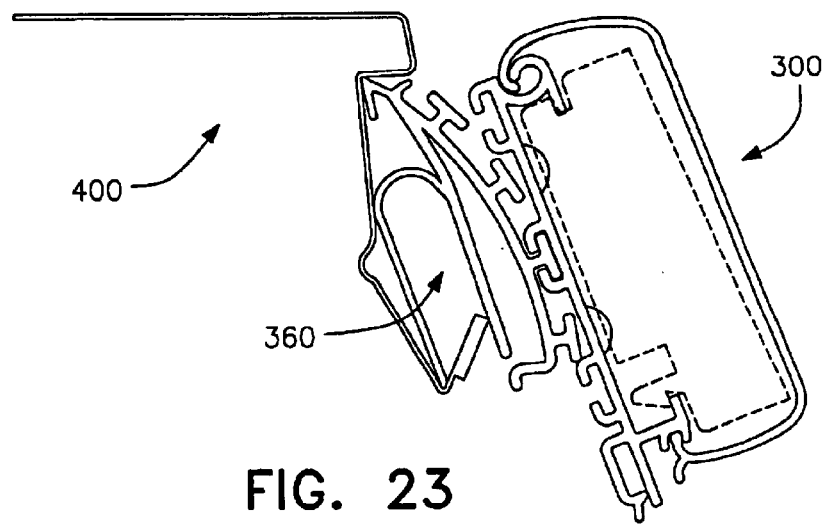
FIGS. 22–24 illustrate the universal C-channel support element secured to an ESL carrier and engaged in a Madix-, Streater- and Lozier-type C-channel, respectively.
Figure 23:
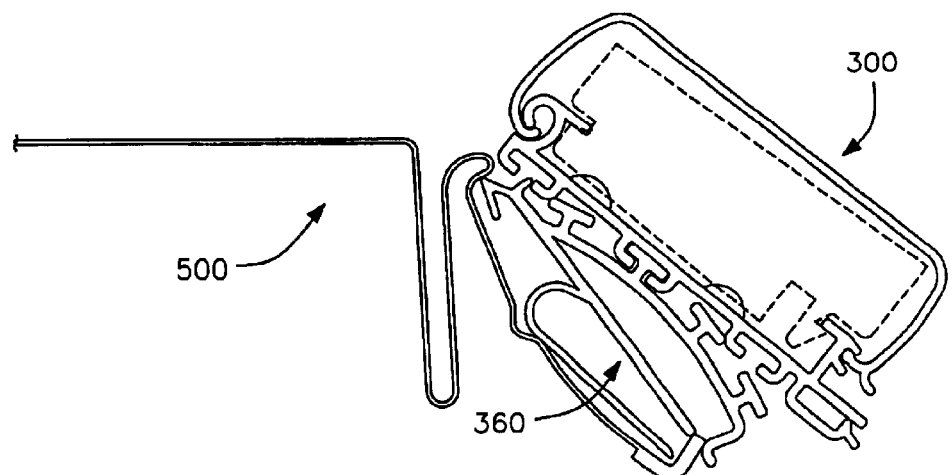

A grip 235 is illustrated at the bottom of the back 230 of the ESL carrier 220 to support a flag or the like shown in dotted lines at 236 in FIG. 15, if desired.

While FIGS. 18 and 19 show schematically an attachment member 215 without identifying the manner in which it is secured to a supporting surface, it will be understood that the attachment member 215 can be supported in any manner, such as shown in the previous embodiments, without departing from the instant inventive concepts.

Figure 24:
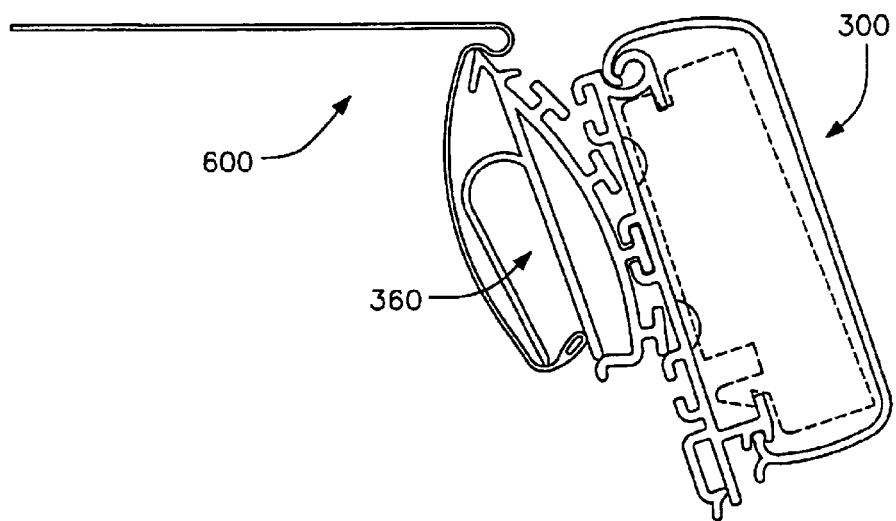

A particularly advantageous construction for supporting an attachment member of the type seen in FIG. 18 is illustrated in FIGS. 20–23 wherein like parts bear similar reference characters in the 300 series. An attachment member 315 is formed as an integral part of a support or C-channel engaging element designated by the reference numeral 360. The support element 360 is adapted to provide flexibility enabling the same to be engaged in different commercially available shelf units seen at 400, 500 and 600, respectively, in FIGS. 22–24, and known as Madix, Streater and Lozier shelves. The C-channels of each of these shelves include the equivalent of an upper, downwardly depending, lip and a lower, upwardly extending, lip for receipt of upper and lower portions of fit-in accessories, but the distance between these lip members, as well as the angle provided by the lip members, are different in each of these types of shelves. Thus, when prior art price channels of the type seen in U.S. Pat. No. 5,394,632 issued Mar. 7, 1995 (the '632 patent), the subject matter of which is incorporated herein in its entirety by reference, are engaged in the C-channels of Lozier, Madix and Streater shelves, the engagement may be less than secure because of the differences in the spacing between the upper and lower lips of these shelves. Moreover, when a price channel such as seen in the '632 patent is engaged in the C-channels of these different shelf units, the angle of presentation of the label or, in this instance, the ESL is significantly different from the angle of inclination of a label, engaged directly in the C-channel of such shelves. In some instances, the change in the viewing angle makes it more difficult for a customer or merchandiser or the like to read the information on the label carried by the price channel. For that reason, the leg 365 of the support element 360 is a resilient element with an upward bow at 365a which provides additional adjustability to enable the same to be supported in any of the C-channels of the commercially available shelf units without significantly adjusting the angle of viewing of the ESL that would otherwise be provided.

From the foregoing, it will be recognized that, by utilizing the universal attachment member of the embodiments of FIGS. 14–24, a great deal of versatility is afforded and the potential number of dies for manufacturing the ESL carrier is significantly reduced.

While the ESL carriers of FIGS. 14–24 are useful, and provide unique advantages over other ESL holders commercially available, a further preferred embodiment of the ESL is shown in FIGS. 25–27 wherein parts similar to the elements in the previous embodiments bear the same reference numeral, but in the 400 series. Thus, the ESL carrier according to this embodiment is comprised, basically of three parts, an attachment member 415, seen particularly in FIG. 25, a holder member 420, seen particularly in FIG. 26 adapted to removably receive and support one or more ESL devices 450, and a cover member 440, partially seen in FIG. 27.

The attachment member 415, in this embodiment, comprises a backing element 416, preferably formed of a rigid polyvinyl chloride or the like, and comprised of three angled sections, 416a, 416b and 416c. A multiplicity of spaced T-shaped protrusions, 417a, 417b, 417c and 417d are shown, quite like the previous embodiment except that, in this instance, the stem portions 417a', 417b', 417c' and 417d', are formed of a medium durometer or flexible plastics materials such as polyvinyl chloride and connected to relatively rigid PVC cross-bars 417a'', 417b'', 417c'' and 417d''', respectively. Further, the stem portions 417b' and 417c' of the middle pair of T-shaped protrusions 417b and 417c, respectively, are slightly longer than the stem portions 417a' and 417d' and are connected to the backing element 416 at the intersections 416' between the segments 416a and 416b, and the intersection 416'' between the segments 416b and 416c.

The back 430 of the ESL holder member 420 includes a plurality of spaced pairs of upper and lower fingers 431a, 431b, which define between them T-shaped cavities 433a, 433b, 433c and 433d, adapted to selectively receive the T-shaped projections 417 on the attachment member 415. In this instance, there are four T-shaped cavities, 433a–433d, formed on the holder member 420, a pair of upper cavities 433a and 433b, and a pair of lower cavities 433c and 433d. This construction, along with the design of the angular backing element 416 on the attachment member 415 and the resiliently supported T-shaped projections 417a–417d, enables a pair of T-shaped projections to be simultaneously engaged in a pair of T-shaped cavities for each of the angular orientations, thereby enhancing the stability and security of the engagement between the attachment member 415 and the holder member 420 to preclude accidental disengagement in the event of an impact.

For example, by reference to FIG. 28A, the intermediate T-shaped projections 417b and 417c can be interengaged with the intermediate T-shaped cavities 433b and 433c to provide a zero degree uptilt. The flexibility of the stem sections 417b' and 417c' enables the T-shaped projections 417b and 417c to be bent as seen in FIG. 28A to reach the cavities 433b and 433c.

Alternatively, if a 15° uptilt is desired, the upper pair of T-shaped projections 417a and 417b can be engaged in the cavities 433a and 433b as seen in FIG. 28B, with a −15° uptilt provided by engaging the lower pair of T-shaped projections 417c and 417d in the lower pair of T-shaped cavities 433c and 433d as seen in FIG. 28C. In these latter two instances, the unused intermediate T-shaped projections, 417c in FIGS. 28B and 417b in FIG. 28C, are simply bent out of the way in use.

Thus, with this embodiment, at least two projections and cavities are interengaged to provide additional security to minimize the likelihood that the attachment member 415 and the ESL holder member 420 will be disengaged in the event of impact, regardless of the direction of the impact. Moreover, the resilience of the stem portions of the T-shaped projections also acts as a "shock absorber" minimizing the effect of such impact.

While the angle of the segments 416a, 416b and 416c are illustrated for a +15° and a −15° uptilt, respectively, it will be readily recognized that the angle between the segments can be increased or decreased to provide different viewing angles. For example, if the angle between extensions of the center section 416b with the upper and lower sections 416a and 416c, respectively, is increased from 15° to 30°, the viewing angle of the ESL will likewise be increased to a positive or negative 30°.

It will now be seen that there are a variety of embodiments, each of which is designed to carry, display and protect an electronic shelf label in a manner that is easy and inexpensive to manufacture, utilize and maintain. The features of each of the various embodiments may be readily integrated into the other embodiments as will be obvious to those skilled in this art. For example, the sign-holder protuberances and gripping ridges of the cover member 140 of the FIG. 9 embodiment can be added to the cover member 40 of the FIG. 1 embodiment or the cover member 240 of the FIG. 17 embodiment. Moreover, other mounting means as seen, for example, in the above-identified label holder patents or other such prior art devices, can readily be integrated into an ESL carrier according to this invention. Also, a support element such as seen in FIGS. 20–23 can be used to carry an attachment member as seen in FIG. 25. Further, without departing from this invention, the carrier device may be modified to attach the same to the side of a shelf, a wire basket or elsewhere.

The foregoing descriptions and drawings should be considered as illustrative only of the principles of the invention. Numerous applications of the present invention will readily occur to those skilled in the art. Therefore, it is not desired to limit the invention to the preferred embodiments or the exact construction and operation shown and described. Rather, all suitable modifications and equivalents may be resorted to, falling within the scope of the invention.

What is claimed is:

1. In combination,
    a supporting surface,
    an electronic shelf label carrier comprising
        an attachment member including means securing said carrier to said supporting surface and including portions defining a backing element having a front portion spaced from said means securing said carrier to said supporting surface,
    at least one electronic shell label,
    a unitary holder member including means supporting said electronic shelf label, said holder member being of one piece construction and including a backing element having a rear portion spaced from said means supporting said electronic shelf labels,
    a cover member including means attaching said cover member to said holder member to overly and protect said electronic shelf labels, and
    means for adjusting the angular orientation of said electronic shelf label relative to said supporting surface, comprising interengageable complementary angular adjustment elements being defined on and integral with said front portion of said attachment member and integral with said rear portion of said holder member, respectively whereby, by selectively interengaging angular adjustment elements on said attachment member with selective angular adjustment elements on said holder member, the angular orientation of said holder member and said electronic shelf labels carried thereby relative to said attaching member and said supporting surface to which it is secured, can be adjusted.

2. The combination of claim 1 wherein said attachment member includes spaced upper and lower elements extending forwardly from said attachment member backing element, said holder member including upper and lower elements extending rearwardly from said holder member backing element, at least two angular adjustment elements being defined on each of said upper and lower elements of said attachment member in spaced relationship to each other, and at least one complementary angular adjustment element being defined on each of said upper and lower elements of said holder member, whereby an angular adjustment element on said upper element of said holder member may be selectively interengaged with one of said angular adjustment elements on said upper element of said attachment member, and an angular adjustment element on said lower element of said holder member may be selectively interengaged with one of said angular adjustment elements on said lower element of said attachment member to selectively adjust the angular orientation of said electronic shelf labels.

3. The combination of claim 2 wherein said interchangeable complementary angular adjustment elements comprise complementary protrusions and cavities.

4. The combination of claim 3 wherein a pair of spaced cup-shaped elements defining said cavities are defined on each of said upper and lower elements of said attachment member, and a complementary protrusion is defined on a free end of each of said upper and lower elements of said holder member.

5. The combination of claim 1 wherein said angular adjustment elements comprise complementary protrusions and cavities.

6. The combination of claim 5 comprising a plurality of said protrusions defined in spaced relationship to each other on one at said front portion of said backing element of said attachment member and said rear portion of said backing element of said holder member, and a plurality of said cavities defined in spaced relationship to each other on the other of said front portion of said backing element of said attachment member and said rear portion of said backing element of said holder member.

7. The combination of claim 6 wherein said backing element of said attachment member is arcuate.

8. The combination of claim 7 wherein said protrusions and cavities are generally T-shaped.

9. The combination of claim 8 wherein said cavities are defined by opposing resilient lip members enabling a selected protrusion to be interengaged with a selected cavity by snapping or sliding said protrusion into said cavity.

10. The combination of claim 6 wherein said backing element of said attachment member includes a central portion and a pair of angularly offset wing portions attached thereto.

11. The combination of claim 10 wherein said protrusions and cavities are generally T-shaped.

12. The combination of claim 11 wherein said cavities are defined by opposing resilient lip members enabling selected protrusions to be interengaged with selected cavities by snapping or sliding said protrusions into said cavities.

13. The combination of claim 12 wherein said protrusions each include a stem portion having one end secured to said backing element and a spaced end carrying a cross-bar, and wherein said stem portions are resilient.

14. The combination of claim 13 wherein said backing member and said cross-bars are relatively ridgid compared to said stem portions.

15. The combination of claim 13 wherein at least one of said protrusions is secured to each of said wing portions of said backing element and a further protrusion is secured to said backing element at the intersection of said central section with each of said wing sections.

16. The combination of claim 15 wherein said cavities are defined in pairs on said rear portion of said backing element of said holder member and include at least an upper pair and a lower pair, the lower cavity of said upper pair and the upper cavity of said lower pair being spaced from each other a distance greater than the spacing between the cavities of each pair of cavities.

17. The combination of claim 16 wherein said stem portions of said protrusions secured at said intersection of said central section with each of said wing sections are longer than said stem portions of said protrusions secured to each of said wing sections.

18. The combination of claim 1 wherein said holder member includes upper and lower elements extending forwardly from said holder member backing element, a generally C-shaped cavity defined on one of said upper and lower forwardly extending holder member elements, and a detent being defined on the other of said upper and lower forwardly extending holder member elements, said cover member being generally U-shaped and including a front portion and a pair of rearwardly extending legs each having a terminal edge, said means for attaching said cover member to said holder member comprising a generally C-shaped element defined on the edge of one of said legs of said cover member and pivotally engaged in said C-shaped cavity, and a bent element defined on the edge of the other of said legs of said cover member and removably engageable in said detent to enable said cover member to be selectively opened and closed.

19. The combination of claim 18 further including protrusions defined on each of said legs of said cover member, and a sign holder removably received supported by said protrusions.

20. The combination of claim 18 further including grip means defined by portions of said holder member, and an information-containing flag removably supported by said grip means.

21. The combination of claim 1 wherein said supporting surface includes a C-channel, and said attachment means includes portions engaged in said C-channel.

22. The combination of claim 1 comprising a plurality of protrusions defined in spaced relationship to each other on one of said front portion of said backing element of said attachment member and said rear portion of said backing element of said holder member, and a plurality of cavities defined in spaced relationship to each other on the other of said front portion of said backing element of said attachment member and said rear portion of said backing element of said holder member.

23. The combination of claim 22 wherein said backing element of said attachment member is arcuate.

24. The combination of ciaim 23 wherein said protrusions are generally T-shaped and said cavities are defined by opposing resilient lip members enabling a selected protrusion to be interengaged with a selected cavity by snapping or sliding said protrusion into said cavity.

25. The combination of claim 23 wherein said supporting surface includes a C-channel having an outwardly and downwardly extending upper lip and an outwardly and upwardly extending lower lip, and said attachment member includes portions engaged under said lips.

26. The combination of claim 25 wherein said attachment member includes a main support element having an upper end, a lower end, a front surface and a rear surface, said backing element of said attachment member having an upper end attached to said front surface of said main support element intermediate said upper and lower ends of said main support element, and a free lower end, a resilient leg having an upper end attached to said rear surface of said main support element intermediate said upper and lower ends of said main support element, and a free lower end, said upper end of said main support element being engaged under said upper lip of said C-channel and said free lower end of said leg being engaged under said lower lip of said C-channel.

27. The combination of claim 26 wherein said leg of said attachment member has a flexible arcuate portion extending upwardly beyond the attachment of said leg to said rear surface of said main support member, whereby said attachment member may be securely engaged in C-channels of differing dimensions between its upper and lower lips.

28. In combination,
a supporting surface,
at least one electronic shell label,
an electronic shell label carrier comprising
a holder member including a backing element having upper and lower ends and front and rear surfaces, means supporting said electronic shelf labels forwardly of said front surface of said backing element and intermediate said upper and lower ends,
a cover member including means attaching said cover member to said holder member to overly and protect said electronic shelf labels, and
means securing said carrier to said supporting surface with a predetermined angular orientation of said electronic shelf labels relative to said supporting surface,
said means for securing said carrier to said supporting surface comprising a leg member having an upper end and a lower end, one of said ends of said leg member being hingedly secured to one of said ends of said backing element of said holder member with the remainder of said leg member extending at an angle to said rear surface of said backing element and the other end of said leg member spaced from said rear surface of said backing element, and a spacer member secured to said other end of said leg member and extending toward said rear surface of said backing member intermediate said upper and lower ends of said backing member to fix the angular orientation of said holder member, and thereby, said electronic shelf labels carried thereby, relative to said supporting surface.

29. The combination of claim 28 wherein said upper end of said leg member is resiliently secured to said upper end of said backing element to fix the angular orientation of said electronic shelf labels at a positive uptilt relative to said supporting surface.

30. The combination of claim 28 wherein said lower end of said leg member is resiliently secured to said lower end of said backing element to fix the angular orientation of said electronic shelf labels at a negative uptilt relative to said supporting surface.

31. An electronic shelf label carrier comprising
   a unitary holder member being of one piece construction, including gripping elements for supporting at least one electronic shelf label and including integrally formed holder member angular adjustment elements for selectively supporting and positioning said holder member at plural angular orientations relative to an attachment member;
   an attachment member for attaching said carrier on a supporting surface and including at least one attachment member angular adjustment element for interengaging with said holder member angular adjustment elements whereby by selectively interengaging said holder member and attachment member angular adjustment elements the angular orientation of said holder member and electronic shelf label carried thereby relative to said attachment member and the supporting surface to which it is secured, can be adjusted and wherein said holder member and attachment member angular adjustment elements comprise complementary protrusions and cavities whereby a protrusion on one of said holder member and attachment member is insertable within a cavity located on the other of said holder member and attachment member.

32. In combination,
   a supporting surface,
   an electronic shelf label carrier comprising
   an attachment member including means securing said carrier to said supporting surface,
   at least one electronic shelf label,
   a holder member including means supporting said electronic shelf label, and
   means for adjusting the angular orientation of said electronic shelf labels relative to said supporting surface,
   said means for adjusting the angular orientation comprising interengageable complementary angular adjustment elements defined on said attachment member and said holder member, respectively, whereby, by selectively interengaging angular adjustment elements on said attachment member with selective angular adjustment elements on said holder member, the angular orientation of said holder member and said electronic shelf labels carried thereby relative to said attaching member and said supporting surface to which it is secured, can be adjusted,
   wherein said attachment member includes portions defining a backing element having a front portion spaced from said means securing said carrier to said supporting surface, and said holder member includes a backing element having a rear portion spaced from said means supporting said electronic shelf labels, said interengageable complementary angular adjustment elements being defined on said front portion of said attachment member and said rear portion of said holder member, respectively,
   wherein said angular adjustment elements comprise a plurality of complementary protrusions and cavities wherein a plurality of said protrusions are defined in spaced relationship to each other on one of said front portion of said backing element of said attachment member and said rear portion of said backing element of said holder member, and a plurality of said cavities defined in spaced relationship to each other on the other of said front portion of said backing element of said attachment member and said rear portion of said backing element of said holder member, said protrusions each include a resilient stem portion having one end secured to said backing element and a spaced end carrying a cross-bar, wherein said backing element member and said cross-bar are relatively rigid compared to said stem portion.

* * * * *